United States Patent
Lei et al.

(10) Patent No.: US 8,089,877 B2
(45) Date of Patent: Jan. 3, 2012

(54) METHOD, SYSTEM, PROGRAM, AND READABLE STORAGE MEDIUM FOR PROVIDING SERVICE QUALITY GUARANTEE TO NETWORK SERVICE

(75) Inventors: Li Lei, Beijing (CN); Satoshi Imai, Kawasaki (JP); Akiko Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/939,775

(22) Filed: Nov. 14, 2007

(65) Prior Publication Data
US 2010/0238802 A1    Sep. 23, 2010

(30) Foreign Application Priority Data

Nov. 15, 2006 (CN) .......................... 2006 1 0146537
Sep. 28, 2007 (JP) .............................. 2007-255680

(51) Int. Cl.
*H04J 1/16* (2006.01)
(52) U.S. Cl. ........................................ 370/231; 370/400
(58) Field of Classification Search ............. 370/395.21, 370/395.41, 395.42, 395.43, 389, 400, 229, 370/231, 235, 236, 411
See application file for complete search history.

(56) References Cited

U.S. PATENT DOCUMENTS 6,359,976 B1 * 3/2002 Kalyanpur et al. ........... 379/134
7,212,491 B2 * 5/2007 Koga ............................ 370/229

* cited by examiner

*Primary Examiner* — Brenda H Pham
(74) *Attorney, Agent, or Firm* — Katten Muchin Rosenman LLP

(57) ABSTRACT

A method for guaranteeing a service quality of a network service is disclosed that includes the steps of storing a historical record of a network service quality, inputting an acceptable maximal service delay of the network service, inputting a desired control level between the service quality of the network service and the number of users of the network service, determining the content of service quality guarantee, which can be provided to each service node, with respect to each pair of service nodes in accordance with the historical record, the maximal service delay, and the control level between the service quality and the number of users, monitoring the service quality between a corresponding pair of service nodes in accordance with the content of service quality guarantee, and regulating the network service between a pair of service nodes in a case where degradation of service quality occurs between the pair of service nodes.

10 Claims, 18 Drawing Sheets

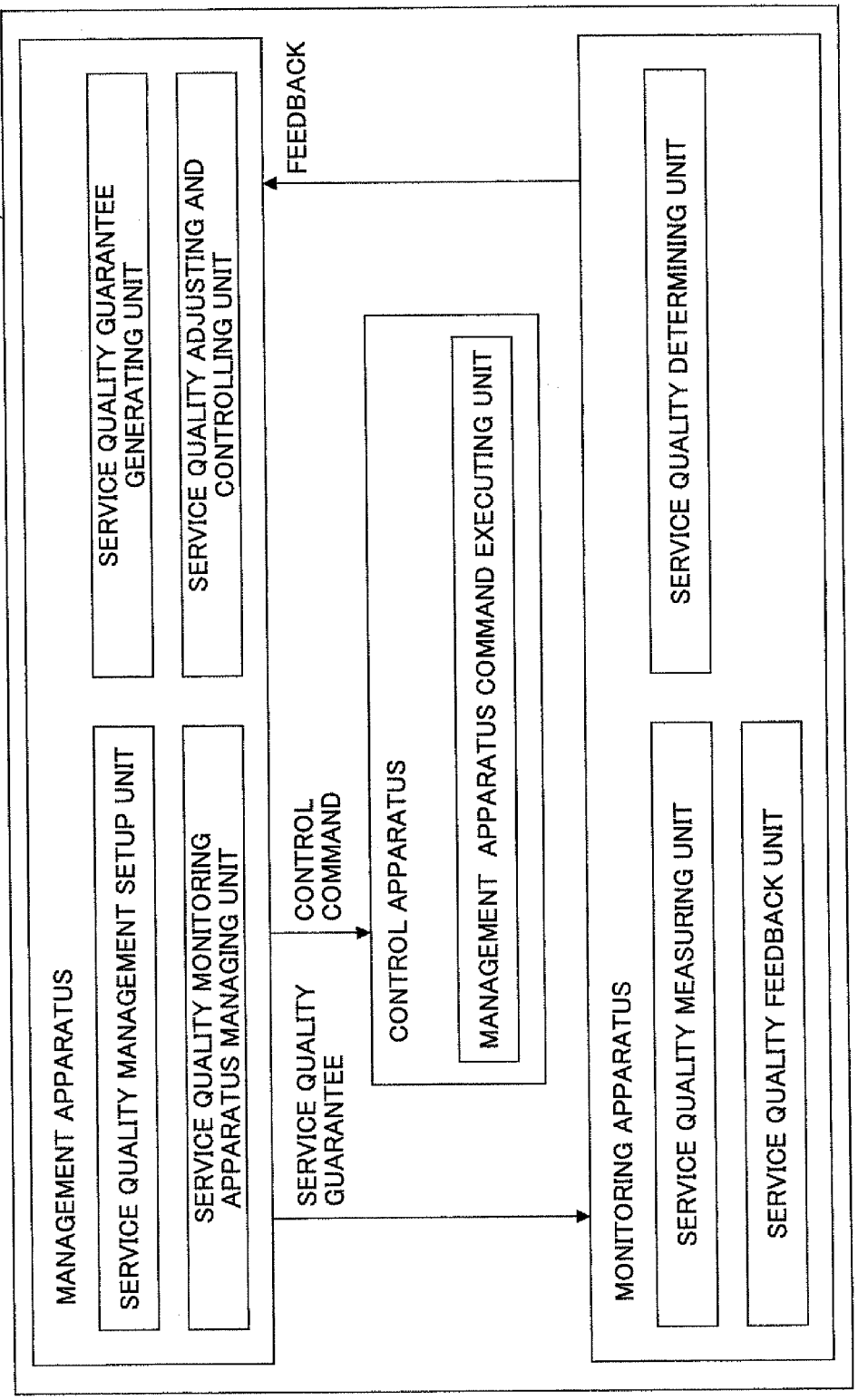

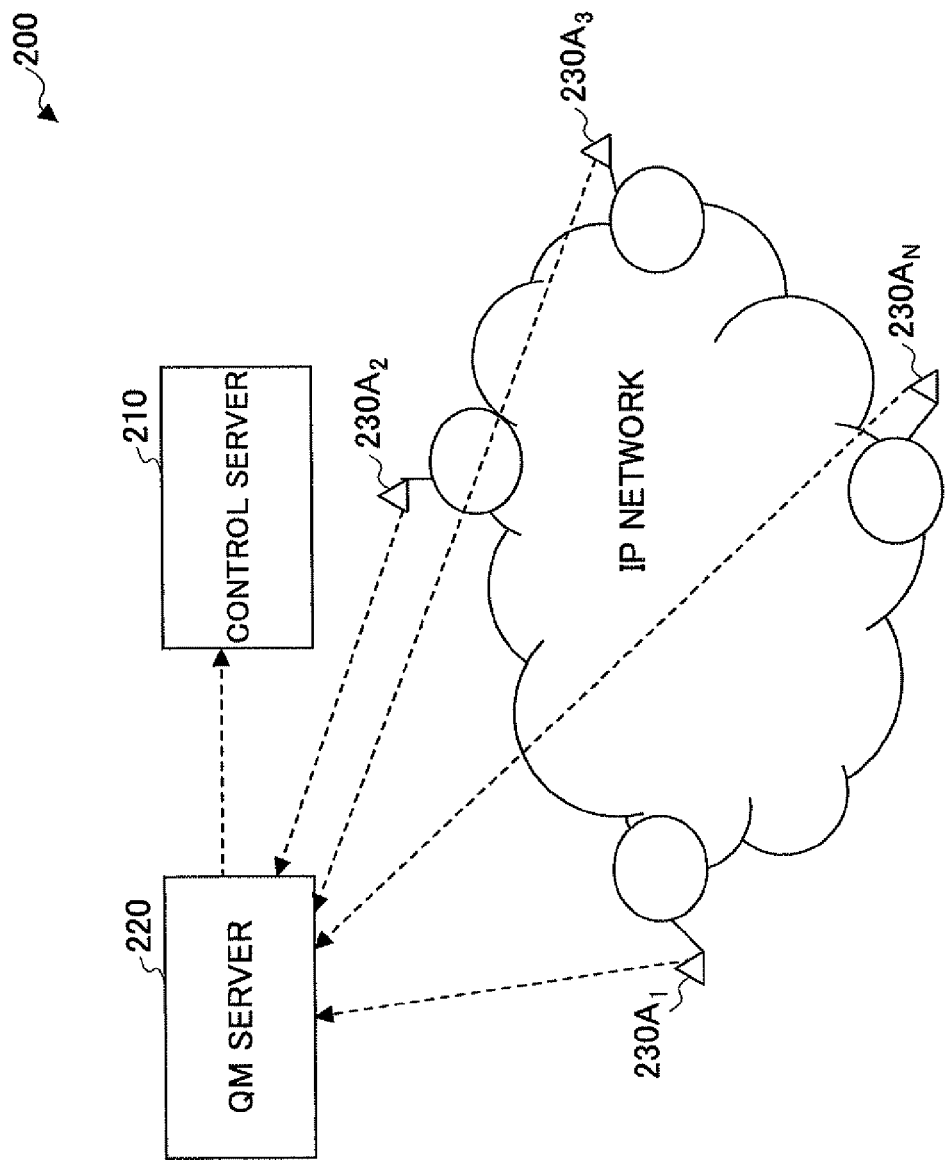

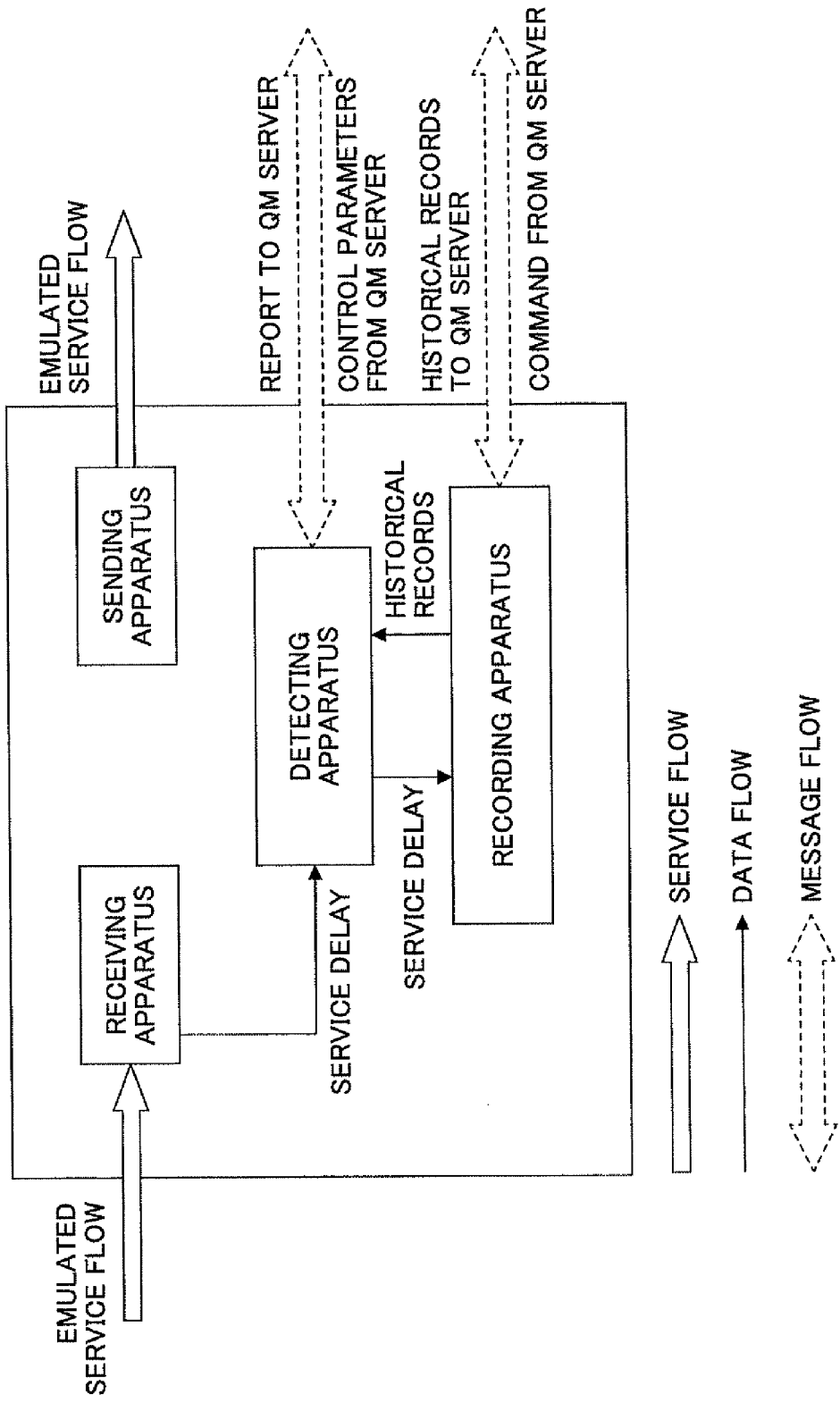

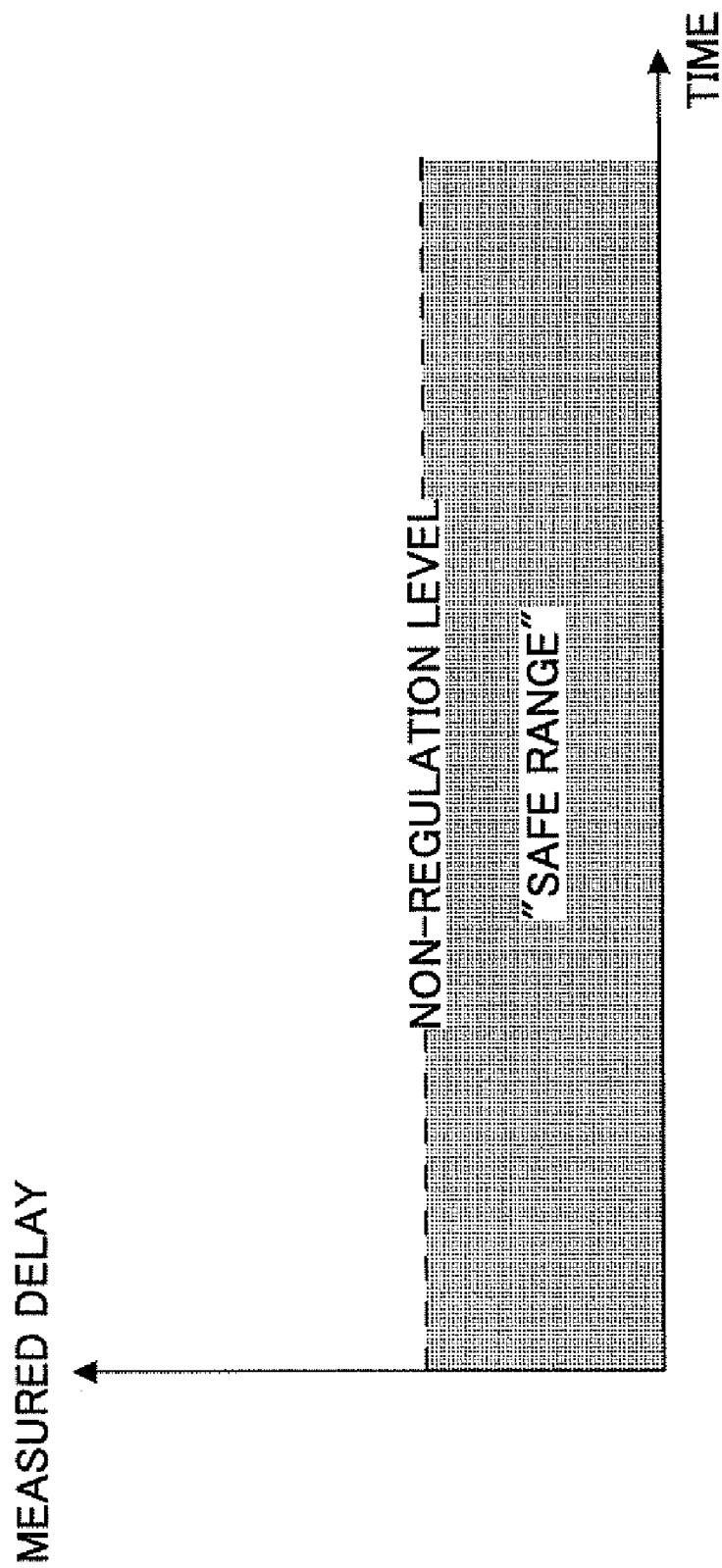

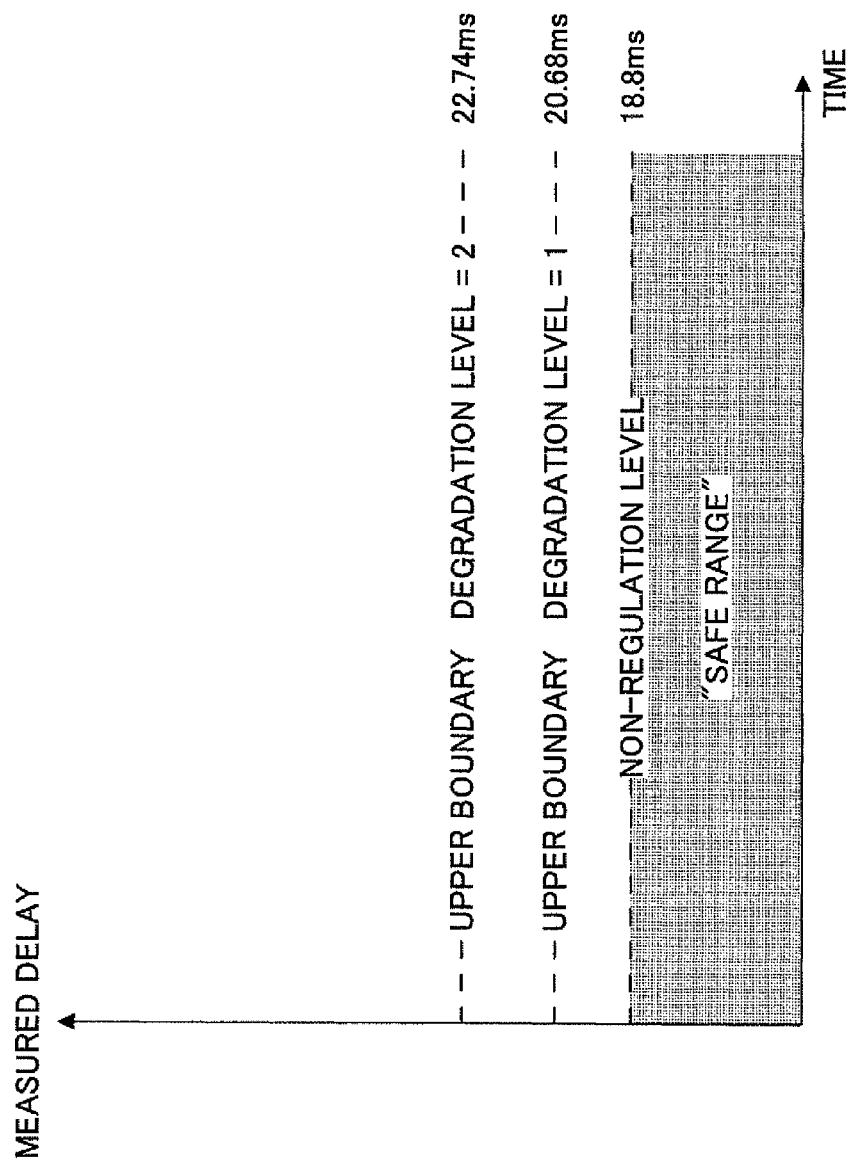

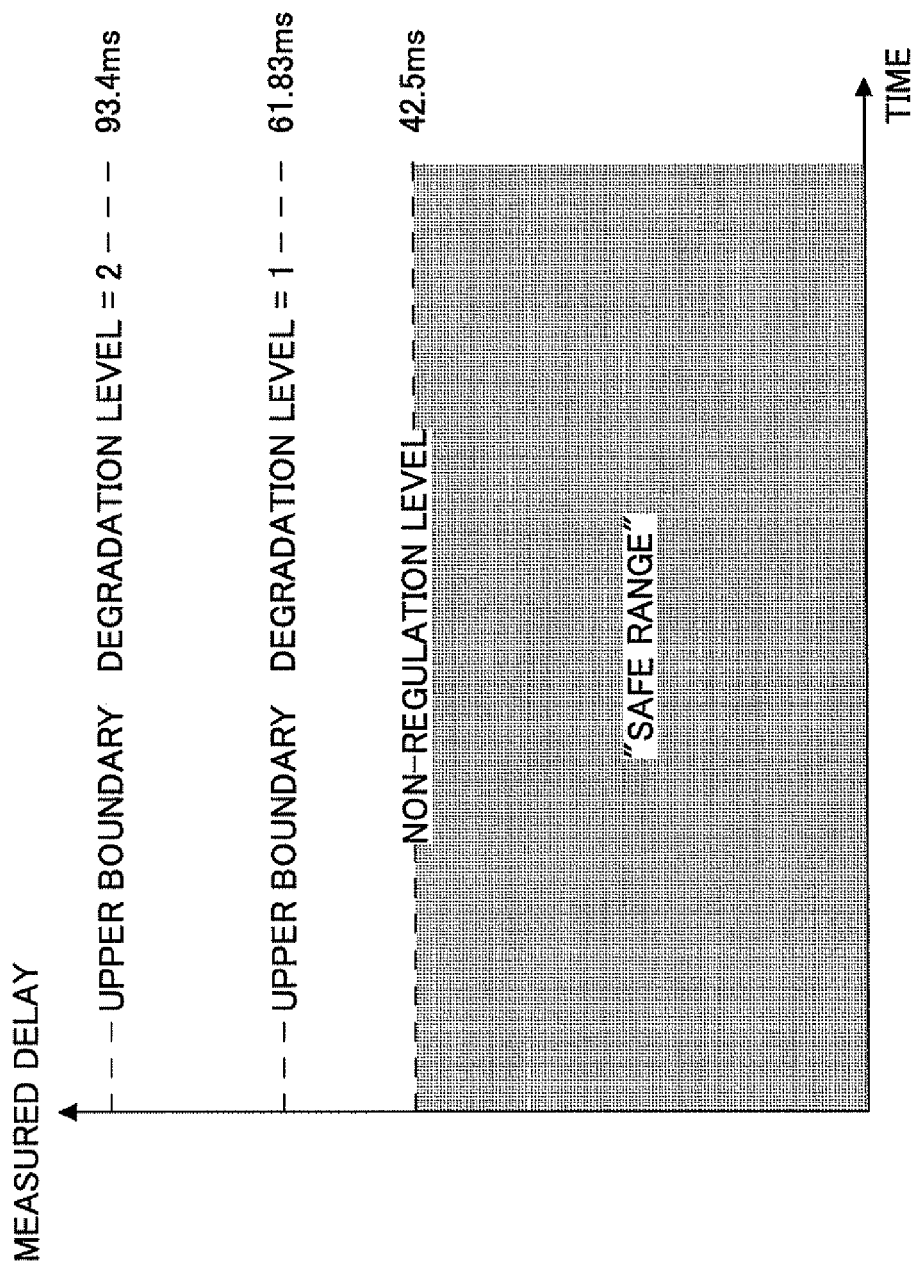

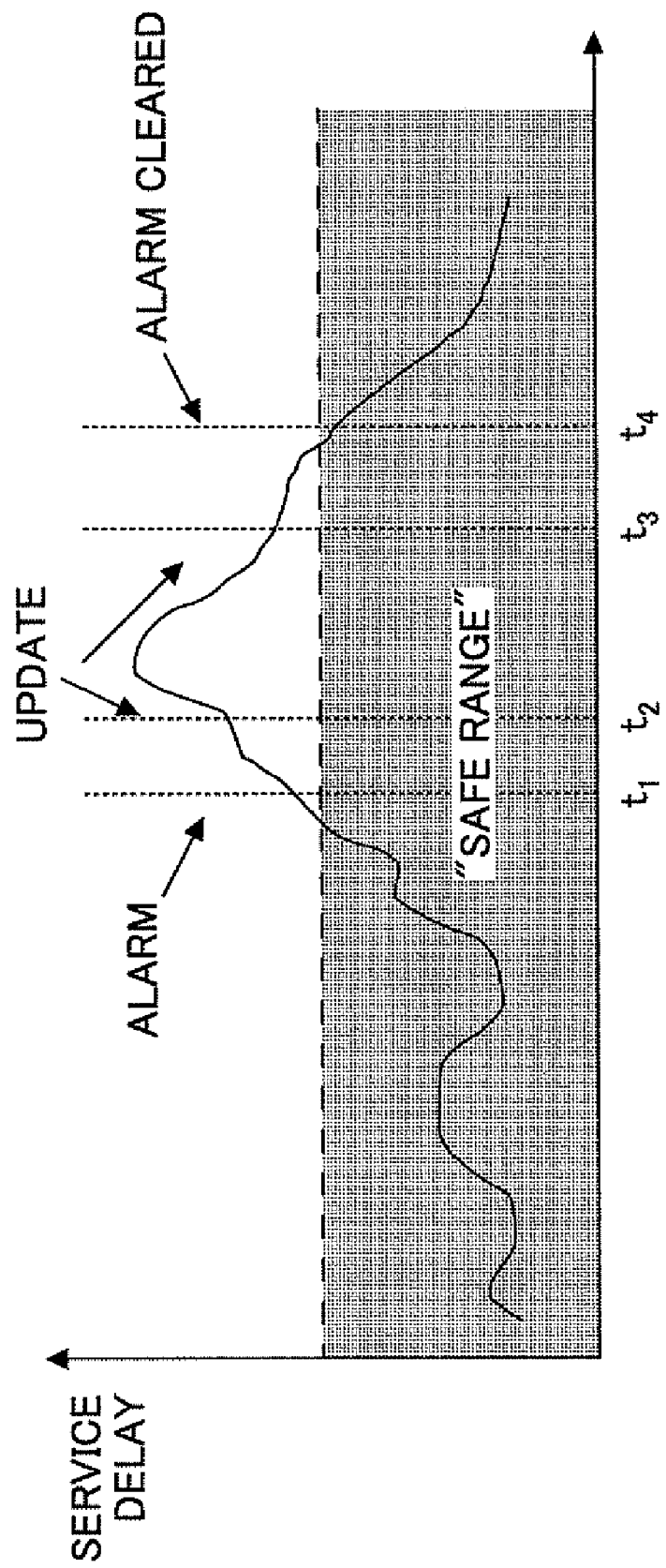

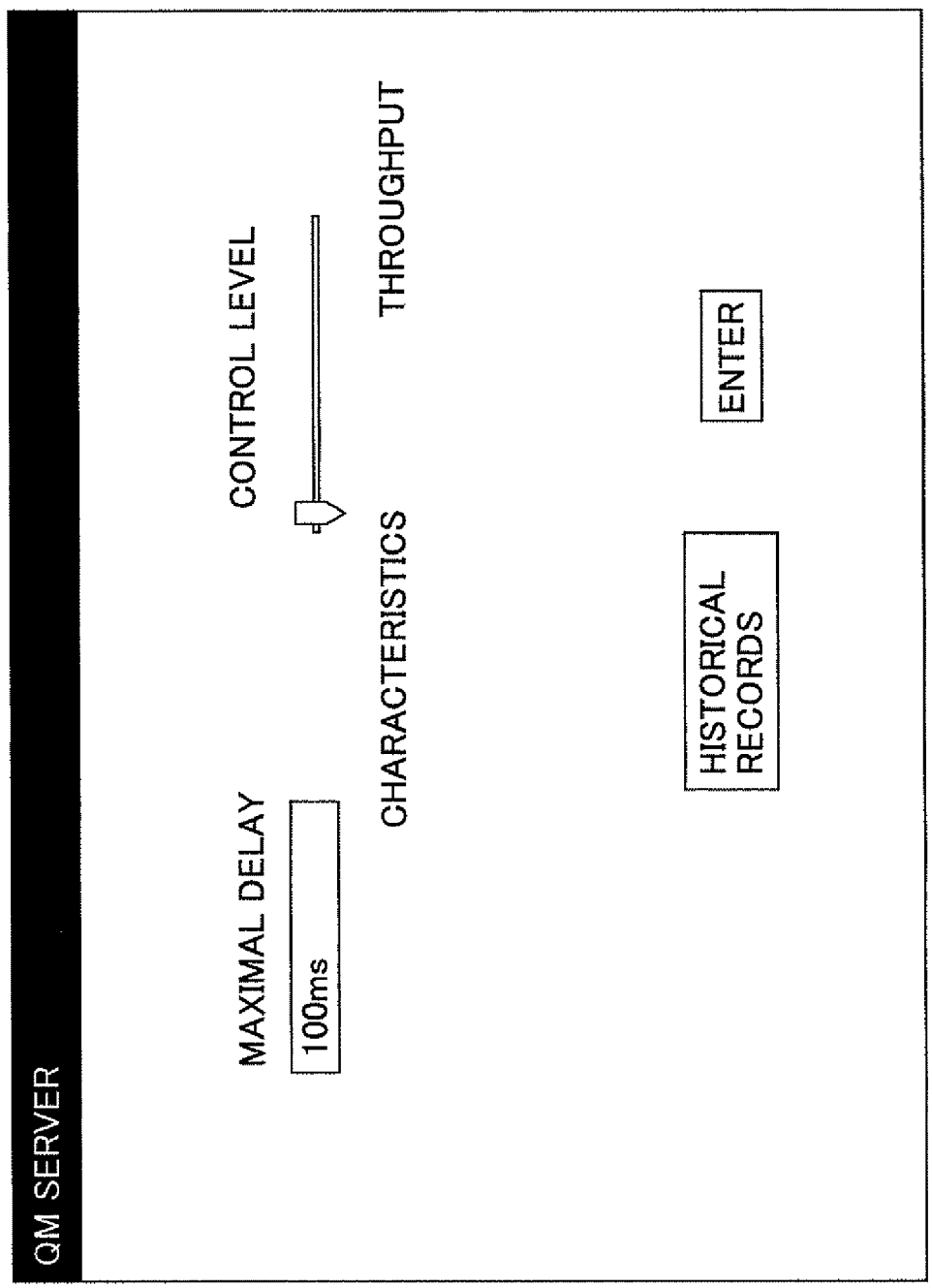

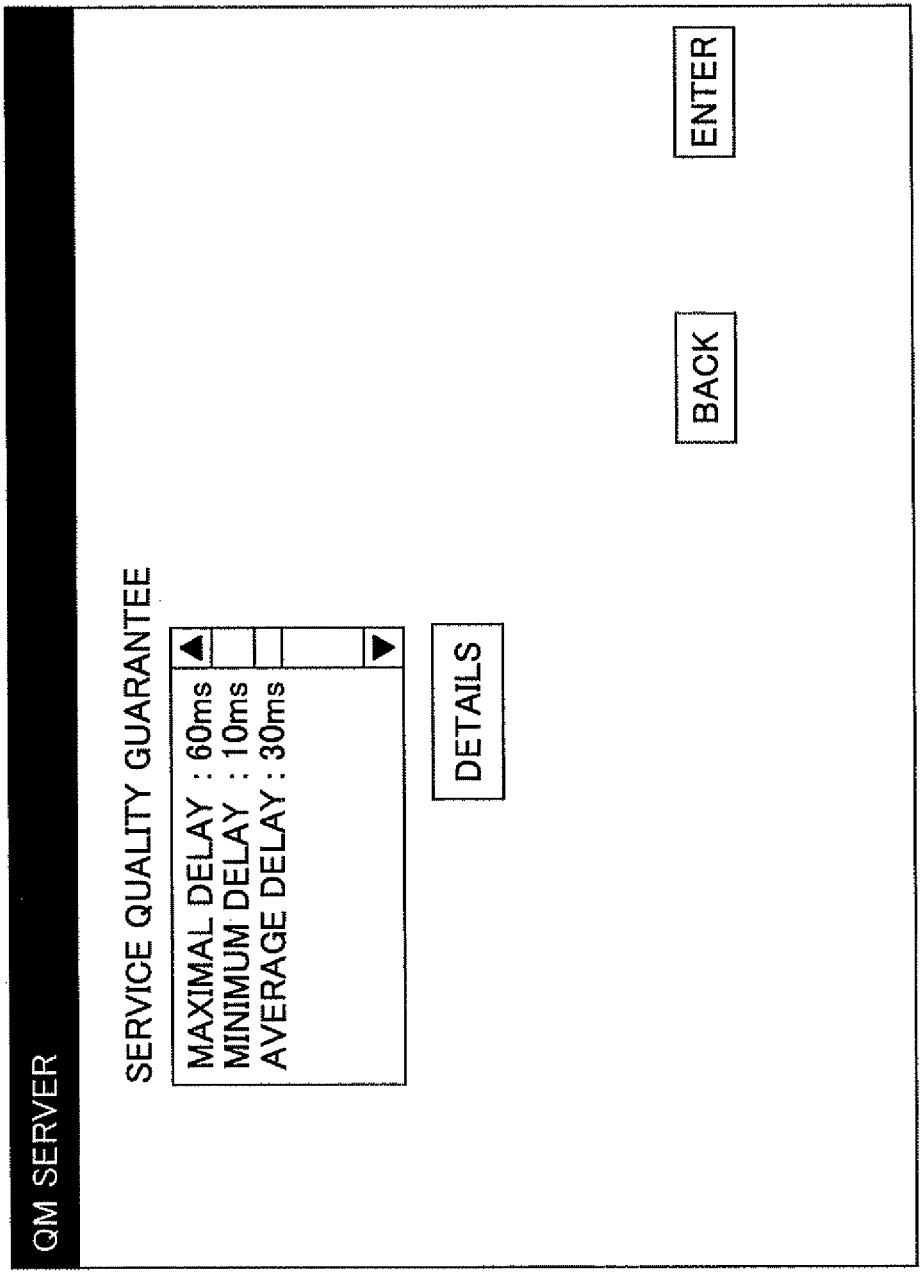

FIG.6C

QM SERVER

SERVICE QUALITY GUARANTEE OF EACH PAIR OF SERVICE NODES

| PAIR OF SERVICE NODES | SPEECH DELAY GUARANTEE | OPERATE | | | | |
|---|---|---|---|---|---|---|
| FROM REGION A TO REGION B | 45ms | UPDATE | | | | |
| FROM REGION B TO REGION A | 45ms | UPDATE | | | | |
| | | | | | | |
| | | | | | | |

BACK

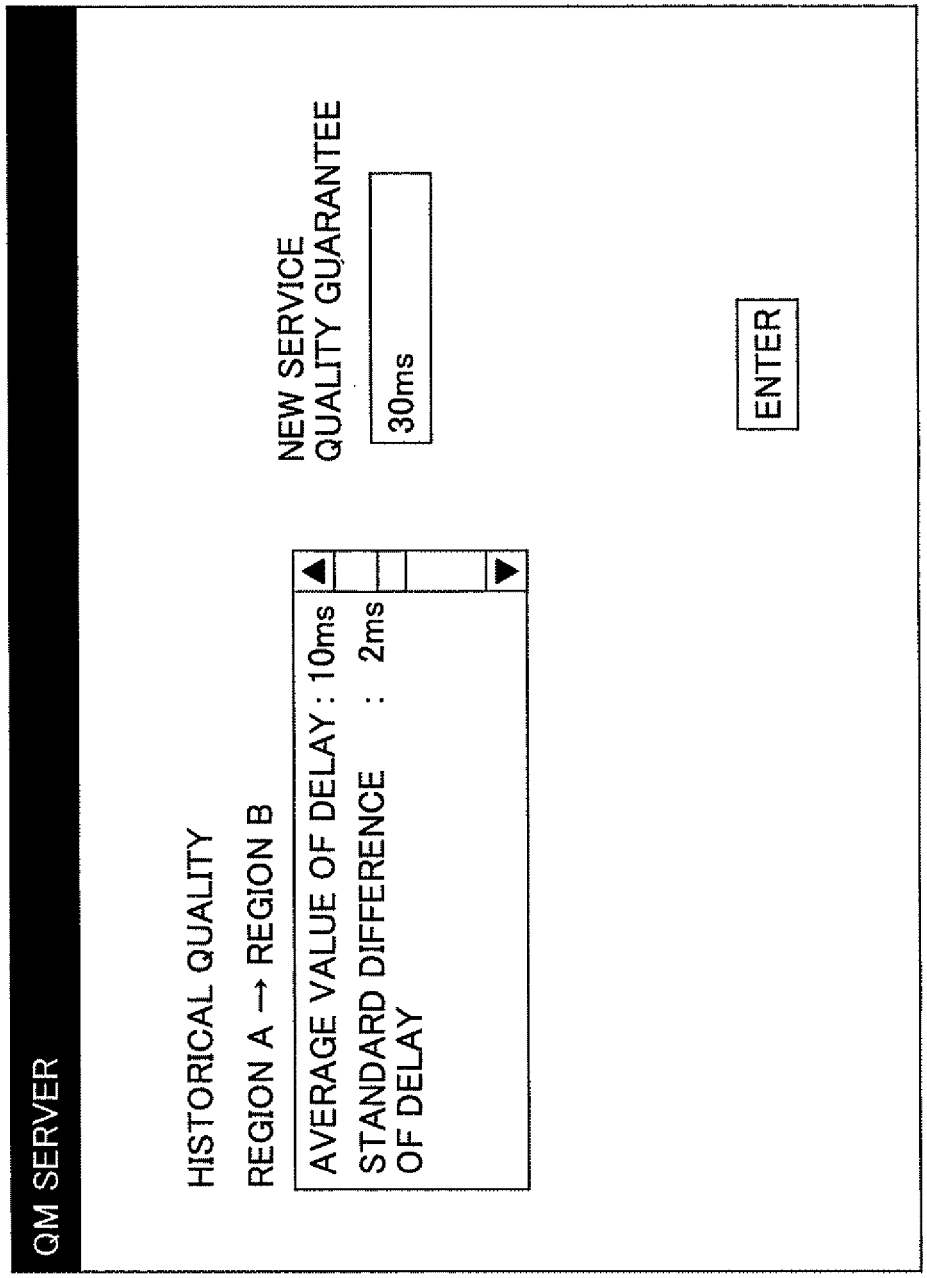

FIG.8

| POSITION INFORMATION | HISTORICAL RECORDS | DELAY GUARANTEE AS PROVIDED | SENSITIVITY | STRICT |
|---|---|---|---|---|
| FROM REGION A TO REGION B | AVERAGE DELAY: 10ms STANDARD DIFFERENCE OF DELAY: 2ms | 20ms | 5.0 | NO |
| .... | .... | .... | .... | .... |

FIG.9B $$P\_U = \frac{1}{\text{sensitivity}^2} \qquad P\_D = 1 - \frac{1}{\text{sensitivity}^2} \qquad \text{※ FORMULA 4}$$

| MEASURED PATH | P_U | P_D |
|---|---|---|
| A ⇒ C | $1/(5.4)^2 = 0.034$ | $1-1/(5.4)^2 = 0.966$ |
| A ⇒ B | $1/(4.5)^2 = 0.049$ | $1-1/(4.5)^2 = 0.951$ |

$$P\_U\_L_{\text{degradation\_level}=i} = \frac{P\_U}{(1+\text{Adjust\_Level})^i}$$

$$P\_D\_L_{\text{degradation\_level}=i} = \frac{P\_U}{(1+\text{Adjust\_Level})^{i-1}} \qquad \text{※ FORMULA 6}$$

CONTROL PARAMETER : Adjust_Level = 0.1

| | | |
|---|---|---|
| A ⇒ C | P_U_L$_{\text{degradation\_level}=0}$ = 0.034<br>P_U_L$_{\text{degradation\_level}=1}$ = 0.031<br>P_U_L$_{\text{degradation\_level}=2}$ = 0.028<br>... | P_D_L$_{\text{degradation\_level}=1}$ = 0.966<br>P_D_L$_{\text{degradation\_level}=2}$ = 0.878<br>... |
| A ⇒ B | P_U_L$_{\text{degradation\_level}=0}$ = 0.049<br>P_U_L$_{\text{degradation\_level}=1}$ = 0.045<br>P_U_L$_{\text{degradation\_level}=2}$ = 0.04<br>... | P_D_L$_{\text{degradation\_level}=1}$ = 0.951<br>P_D_L$_{\text{degradation\_level}=2}$ = 0.864<br>... |

METHOD, SYSTEM, PROGRAM, AND READABLE STORAGE MEDIUM FOR PROVIDING SERVICE QUALITY GUARANTEE TO NETWORK SERVICE

BACKGROUND OF THE INVENTION

1. Field of the Invention

The present invention generally relates to service quality management in network communications, more particularly to a technology for providing service quality guarantees to the services of network service providers in accordance with their business strategies, and specifically to a method, a system, a program, and a readable storage medium for providing service quality guarantees to a network service.

2. Description of the Related Art

More and more new services currently appear in the packet network. Many of these new services, such as IP telephones, network teleconferences and IP televisions etc., are very sensitive to service qualities. How to effectively guarantee the service qualities of these services is a central problem encountered upon large-scale deployment of these services. Conventional technology and methods for service quality guarantee are mainly divided into the following three types:
1) Excessive setup: this method guarantees the qualities of all network services by providing network resources that are far more than necessary.
2) Multi-protocol label switch (MPLS) and quality of service (QoS): this method guarantees service quality of services having high priorities by managing/adjusting network resources based on a "hierarchical service" frame and multi-protocol label packet technology.
3) Service flow limitation: this method presets an upper limit to the number of active service flows permissible on certain paths in a network, and newly arriving service flows will be denied once the number of the active service flows on these paths reaches this upper limit.

The aforementioned first type of method is most widely applied in the current networks. This is because it is simple in the setup method and no additional functional support by network devices is needed. However, its defects are obvious. As the term itself suggests, "excessive setup" means waste of network resources. What is more important is the fact that, once great changes occur in the network flow, the guarantee provided by "excessive setup" will become invalid.

The aforementioned second type of method is a hot spot of the current research. However, large scale application of this method requires that all network nodes support the functions of MPLS and QoS, and calls for excellent interoperability in these functions. This is impossible to achieve for most current networks.

The aforementioned third type of method demands a great deal of meticulous manual setup, and requires that all service requests be processed by the controlling devices thereof. This makes it impossible for this type of method to be applied in a large scale in the networks.

At the same time, the aforementioned three types of methods share a common defect. It is that network service providers cannot manage or control the guarantees of the service qualities in accordance with their individual operational strategies. To the network service providers, operational strategies are precisely the key for them to subdivide the market and enhance competitiveness.

In the conventional art, technologies relating to the service quality management of network communications generally include measurement technology, monitor technology, and control technology, of which the existing measurement technology merely measures the average network performance within a given time period or measures the network performance before a service flow starts. Such measurement technology cannot measure the quality of the network service in real time.

In the course of monitoring service quality, how to determine the bottom line of service quality and hence determine the degradation and recovery of service quality is one of the most important aspects. In the existing monitor technology, the bottom line of service quality is usually determined by either one of the following two modes: historical service quality, and 2) invariant parameter value. In the first mode, variations (changes) of service quality are restricted within historical variations (changes), and degradation is considered to have occurred once the variations (changes) exceed the historical variations (changes). However, service quality may still actually be good even where the variations exceed the historical variations. In the actual networks, since service quality changes frequently, the "excessive control" engendered by this mode not only greatly increases additional control load but at the same time affects the throughput of the network. Meanwhile, the second mode determines degradation to have occurred only when the service quality is worse than a predetermined parameter value. This mode neglects the fact that service qualities of the same network might be different between service node pairs or at different time periods of the same pair of nodes. For example, although it may be normal to increase the delay by 10 ms for a pair of nodes whose service delay is usually 50 ms to 60 ms, the same variation may be a sign of severe service quality degradation for a pair of nodes whose service delay is usually 5 ms to 10 ms. Therefore, since such a mode with a predetermined parameter value neglects the differences in regionality and timeliness of network service quality, it may be referred to as a "post-reaction" system, in other words, it alerts degradation only after the service quality has severely degraded, thus guarantee of service quality cannot be achieved.

In the conventional control technology, since a quality management (QM) server has to actively measure service quality and analyze the variations of the service quality in order to determine as how to adjust the control policy, the load of the QM server becomes aggravated and the adjustment efficiency of the control policy decreases.

The conventional system, apparatus, and method for controlling the quality of network communications are disclosed, for example, in European Patent Application 00114780.0.

SUMMARY OF THE INVENTION

The present invention may provide a method, a system, a program, and a readable storage medium for providing service quality guarantees to a network service that substantially obviates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a method, a system, a program, and a readable storage medium for providing service quality guarantees to a network service particularly pointed out in the specification in such full, clear, concise, and exact terms as to enable a person having ordinary skill in the art to practice the invention.

To achieve these and other advantages and in accordance with the purpose of the invention, as embodied and broadly described herein, An embodiment of the present invention provides a method for guaranteeing a service quality of a network service, the method including the steps of: storing a historical record of a network service quality; inputting an acceptable maximal service delay of the network service; inputting a desired control level between the service quality of the network service and the number of users of the network service; determining the content of service quality guarantee, which can be provided to each service node, with respect to each pair of service nodes in accordance with the historical record, the maximal service delay, and the control level between the service quality and the number of users; monitoring the service quality between a corresponding pair of service nodes in accordance with the content of service quality guarantee; and regulating the network service between a pair of service nodes in a case where degradation of service quality occurs between the pair of service nodes.

Another embodiment of the present invention provides a system for guaranteeing a service quality of a network service, the system having a management apparatus, a monitoring apparatus, a control apparatus, wherein the management apparatus is connected to the monitoring apparatus and the control apparatus via a network, wherein the management apparatus includes a memory unit for storing a historical record of a network service quality, an input unit for inputting an acceptable maximal service delay of the network service delay and a control level between the service quality of the network service and the number of users of the network service, a service quality guarantee generating unit for obtaining a service quality which can be provided to the network service between each pair of service nodes in the network in accordance with the historical record, the maximal service delay, and the control level between the service quality and the number of users, and an information exchanging unit (interaction unit) for exchanging information between the monitoring apparatus and the control apparatus, wherein the monitoring apparatus monitors the network service quality between a corresponding pair of service nodes in real time in accordance with the service quality guarantee and reporting occurrence of degradation of the service quality between a pair of service node when the degradation occurs, wherein the control apparatus regulates the network service between a pair of service nodes upon receiving a command from the management apparatus.

Another embodiment of the present invention provides a program for guaranteeing a service quality of a network service (network service quality guaranteeing program), the program causing a network service quality guaranteeing system to execute the functions of: storing a historical record of a network service quality; inputting an acceptable maximal service delay of the network service; inputting a desired control level between the service quality of the network service and the number of users of the network service; determining the content of service quality guarantee, which can be provided to each service node, with respect to each pair of service nodes in accordance with the historical record, the maximal service delay, and the control level between the service quality and the number of users; monitoring the service quality between a corresponding pair of service nodes in accordance with the content of service quality guarantee; and regulating the network service between a pair of service nodes in a case where degradation of service quality occurs between the pair of service nodes.

Another embodiment of the present invention provides a storage medium for guaranteeing a service quality of a network service (network service quality guaranteeing program storage medium, the storage medium storing a program causing a network service quality guaranteeing system to execute the steps of: storing a historical record of a network service quality; inputting an acceptable maximal service delay of the network service; inputting a desired control level between the service quality of the network service and the number of users of the network service; determining the content of service quality guarantee, which can be provided to each service node, with respect to each pair of service nodes in accordance with the historical record, the maximal service delay, and the control level between the service quality and the number of users; monitoring the service quality between a corresponding pair of service nodes in accordance with the content of service quality guarantee; and regulating the network service between a pair of service nodes in a case where degradation of service quality occurs between the pair of service nodes.

Other objects and further features of the present invention will be apparent from the following detailed description when read in conjunction with the accompanying drawings.

BRIEF DESCRIPTION OF THE DRAWINGS

FIG. 1 is a block diagram showing a configuration of a system including apparatuses according to an embodiment of the present invention;

FIG. 2 is a block diagram showing a configuration of a preferred embodiment according to the present invention;

FIG. 3 is a block diagram showing a monitoring apparatus according to an embodiment of the present invention;

FIG. 4A is a diagram for describing a non-regulation level;

FIG. 4B is a diagram for describing a non-regulation level and a degradation level;

FIG. 4C is another diagram for describing a non-regulation level and a degradation level;

FIG. 4E is a diagram showing the manner in which service quality change is detected according to an embodiment of the present invention;

FIG. 6A is a schematic diagram showing a graphic user interface of a first input unit according to an embodiment of the present invention;

FIG. 6B is a schematic diagram showing a graphic user interface of a second input unit according to an embodiment of the present invention;

FIG. 6C is a schematic diagram showing a detailed quality guarantee part of a graphic user interface of a third input unit according to an embodiment of the present invention;

FIG. 6D is a schematic diagram showing a changed quality guarantee part of a graphic user interface of a third input unit according to an embodiment of the present invention;

FIG. 8 is a schematic diagram showing a data structure of a memory unit according to an embodiment of the present invention;

FIG. 9B is a schematic diagram showing parameters used for Detection Rules 1 and 2 according to an embodiment of the present invention.

DESCRIPTION OF THE PREFERRED EMBODIMENTS

Figure 4D:
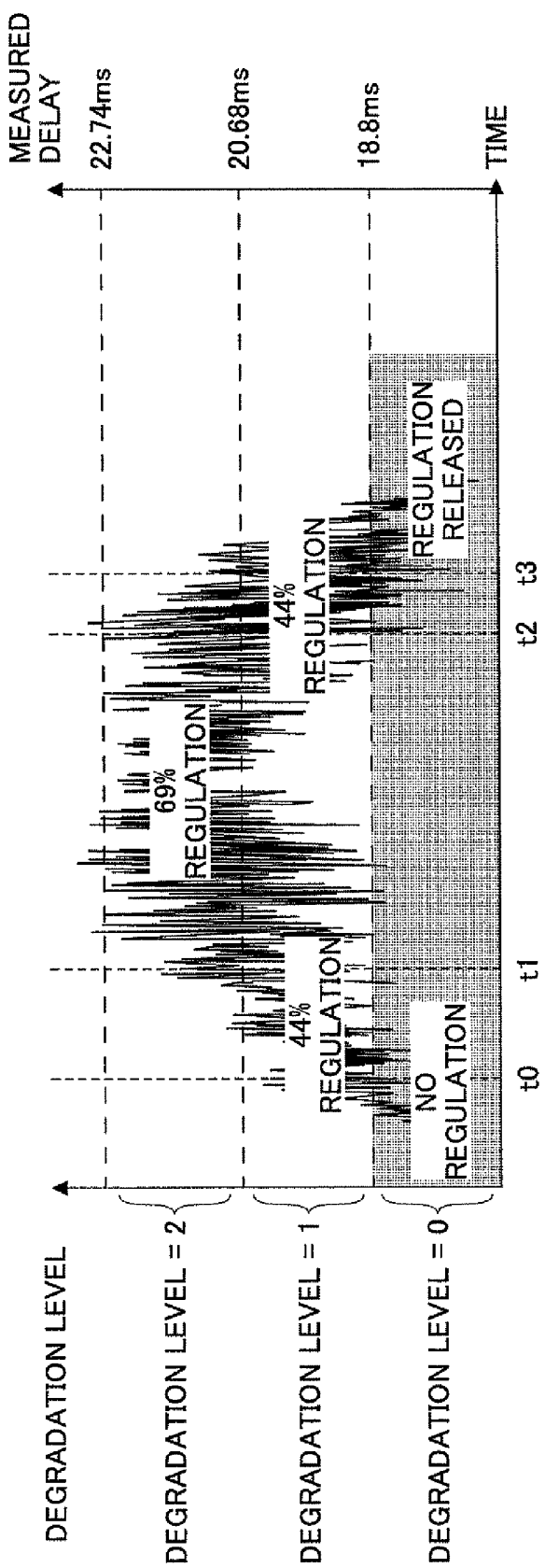
FIG. 4D is a diagram showing the manner in which a regulation ratio is changed in correspondence with degradation level.

In the following, embodiments of the present invention will be described with reference to the accompanying drawings.

The present invention includes embodiments of a method and a program for providing service quality guarantee to a network service. The method and program include, for example, a part for determining the guarantee of service quality in accordance with operational strategies, a part for monitoring quality degradation, and a part for dynamically adjusting a control policy in accordance with the degree of the degradation. Furthermore, the present invention also includes an embodiment of a system for providing service quality guarantee to a network service. The system includes, for example, a central management server, a series of monitoring apparatuses, and a series of control apparatuses. The central management server provides service quality guarantee in correspondence with operational strategies and historical service qualities of each pair of service nodes. The monitoring apparatus actively measures the service quality between a corresponding pair of service nodes and reports occurrence of degradation of service quality to the central management server when the degradation occurs. Upon receiving the report from the monitoring apparatus, the central management server sets a control policy for preventing further degradation of service quality and transmits the control policy to the control apparatus. The control apparatus controls the network service in accordance with the control policy. In the control process, the monitoring apparatus reports change of service quality to the central management server. The central management server dynamically adjusts the control policy in correspondence with the reported change.

<System>

FIG. 1 shows a service quality management system 100 and functions of apparatuses contained therein according to an embodiment of the present invention. The system includes a management apparatus, a monitoring apparatus, and a control apparatus.

The management apparatus can be implemented by a central quality management (QM) server 220 as shown in FIG. 2. The management apparatus has the following functions of: storing and updating historical records (history information of instantaneously measured value of quality) of network service quality; determining the quality guarantee to be provided based on the historical records and the operational strategies of the service provider; determining the control policy when quality degradation occurs; and correspondingly adjusting the control policy when the level of quality degradation changes.

The monitoring apparatus can be implemented by a personal computer (PC) or software/hardware imbedded in a network device. The monitoring apparatus is referred to as a monitoring agent 230 according to an embodiment of the present invention. As shown in FIG. 2, several monitoring agents are arranged in the periphery of the network. The agents and the agent network are connected by, for example, a router (or a node). More specifically, each agent attaches to a router or a node and measures service quality, such as delay time. Accordingly, the agent has a function of a probe for measuring quality. Each agent sends emulated service flows to the other agents. These emulated service flows emulate the network service under quality management. Thereby, the quality of the network service between two network nodes can be indicated by the quality of the emulated service flow between the agents connected to these two nodes. For example, the quality (delay time) between nodes A and C can be calculated by sending measurement purpose RTP packets (equivalent of emulated service flow) from node A to node C and measuring the difference between the time when the node A sends the packets to the node C and the time when the node C receives the packets from node A. The time of sending the packets from the node A may be identified by a time stamp inside the RTP packet. The measuring of quality is performed on each one-way path from one node to another node. Therefore, in this example, the node C (agent attached to the node C) measures the quality of the path that transmits packets from the node A to the node C whereas the node A (agent attached to the node A) measures the quality of the opposite direction path that transmits packets from the node C to the node A. Accordingly, each of the nodes sends RTP packets to each other, and the node (agent attached to the node) that receives an RTP packet measures the service quality (e.g., delay time) of a corresponding one-way path. Based on the quality of the emulated service flow and the service quality guarantee to be provided, the monitoring agent determines whether there is quality degradation, detects the level of quality degradation (in a case where there is quality degradation), and reports the results of the determination/detection to the QM server at regular or irregular intervals.

The control apparatuses are those devices that have already been deployed in the network for supporting a network service, such as an SIP agent server 210 for supporting the VoIP. In the system according to an embodiment of the present invention, these devices manage a control policy sent from the QM server.

<Graphical User Interface (GUI)>

The management apparatus stores the historical records of the quality of the network service being managed, and receives, in the order of the inputting steps as shown from FIG. 6A through 6D, the setup made by a provider of the service based on its operational strategies. In the quality management of the network service, one of the most essential problems is how to make compromise between the service quality and the number of users of this service, to thereby determine control level. Since the network resources are limited, an increase in the number of users of a certain network service results in decrease in the quality of the service due to aggravated competition for the resources. Alternatively, from the aspect of avoiding this, the number of users could be reduced, and thereby achieve communications with higher speed and larger capacity. On the other hand, the increase of the number of users is conducive to the service provider because such increase means corresponding increase of sales. Therefore, the tradeoff between service quality and the number of users should preferably be decided by the service provider based on his own operational strategies.

According to an embodiment of the present invention, the management apparatus provides three levels of setups to facilitate the service provider to manage service quality based on his own operational strategies.

The first level is the maximal delay on the graphical user interface (GUI) as shown in FIG. 6A. The service provider inputs here the acceptable maximal service delay, and this value is the lowest limit (bottom line) of the quality management. In the whole network, service delay is controlled within this value under any circumstance according to an embodiment of the present invention.

The second level is the control level between the service quality desired by the service provider and the number of users. As shown in FIG. 6A, this control level is input with use of a slide bar (indicated as "control level"). In a case where greater importance is placed on the number of users rather than the performance of each user, the slide bar is moved toward the Throughput. Thus, the system allows as many users as possible to enter the network while maintaining maximal service delay designated by the first level. Such setup facilitates the service provider to provide inexpensive network services and to increase profit by serving more users with the same network resources. On the other hand, in a case where importance of the strategy of the service provider is leaned toward service quality (performance) provided to the user rather than the number of users, the slide bar is moved toward the left-side (as shown in FIG. 6A) so that good service quality can easily be maintained. Through the setup of these two levels, the service provider can set the bottom line of the service quality and the control level, which are some of the main contents of the operational strategy of the service provider.

However, under certain circumstances, the service provider may have entered an agreement of service quality guarantee with some important clients, and this requires that the service quality enjoyed by these clients be strictly controlled within the range of their demands. To this end, an embodiment of the present invention provides the third level of setup enabling the service provider to check and change (update) the service quality guarantee of each pair of the service nodes in the manner of "detailed quality guarantee GUI" as shown in FIG. 6C and "changed quality guarantee" as shown in FIG. 6D. Through the setups of the aforementioned three levels, the service provider can flexibly set up the service management in accordance with the service provider's operational strategy. FIGS. 6A through 6D are further described below by using a specific example of setup.

The service provider designates an acceptable maximal service delay and a desired control level with a main GUI. In this example, the acceptable maximal service delay is 100 ms and the desired control level is 0.2.

The service quality guarantee which can be provided by each service is calculated with the service quality guarantee GUI (as shown in FIG. 6B) based on the setup of the main GUI and the historical records of service quality. The service quality guarantee is shown in the service quality guarantee GUI in the form of statistical values of the whole network. In this example, the guarantee capable of being provided by the system to the node with the lowest service quality in the network is 60 ms, and the average quality guarantee provided to all nodes is 30 ms. These statistic data macroscopically exhibit the status of the quality guarantee provided to the network service under the current setup. In a case where the service provider is not satisfied with such status of the quality guarantee, the service provider can return to the main GUI for modifying the setup.

With the detailed quality guarantee GUI in FIG. 6C, the service provider checks the status of the detailed quality guarantee of each pair of the service nodes. In this example, the service delay from Region A to Region B is guaranteed to be within 45 ms. If such guarantee cannot meet the requirement of the user, as for instance the service provider has made an agreement with the users at these two regions guaranteeing the service delay between them to be less than 30 ms, the service provider is required to separately (independently) modify the quality guarantee to this pair of service nodes.

With the changed quality guarantee GUI in FIG. 6D, the service provider separately (independently) modifies the quality guarantee to a specific pair of service nodes. The changed quality guarantee GUI also displays the historical service quality of the pair of nodes to be modified for enabling the service provider to reasonably set the quality guarantee. In this example, the quality guarantee from Region A to Region B is set as 30 ms in accordance with the request of the user.

<Determination the Guarantee of Service Quality>

Figure 7:
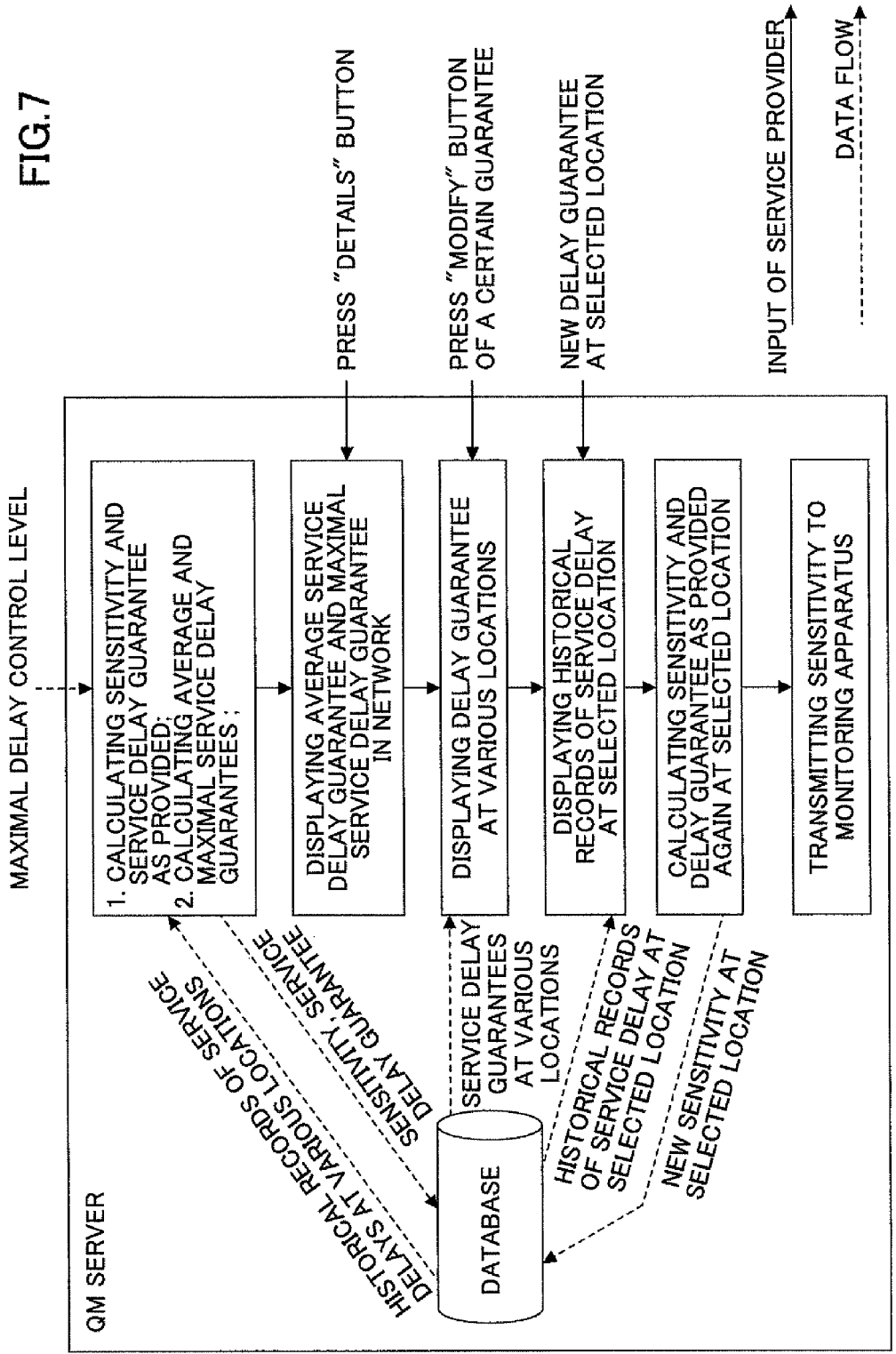
FIG. 7 is an operational flowchart of a management apparatus according to an embodiment of the present invention.

FIG. 7 shows a flowchart for determining the service quality guarantee based on operational strategies. FIG. 8 shows a structure of "database" in FIG. 7. In FIG. 8, each row represents a pair of service nodes. The pair of service nodes may be a pair of nodes between two cities, a pair of nodes between two local area networks, or a pair of nodes between two building according to the monitoring granularity (position of the monitoring apparatus) required by the service provider. Therefore, in some cases "node" may be referred to as "region". In each row, the "node information (position information)" item includes the information of the service node such as the position, IP address/mask etc. The "historical records" item includes previous service quality information such as the average value and standard difference of the service delay. The contents of "service quality guarantee" item and the "sensitivity" item are determined according to the operational strategies and historical service quality of the service provider. The determining method is described hereinafter in detail. The "agreement" item indicates whether the quality guarantee provided to the pair of service nodes is designated by the user.

With reference to the flowchart of FIG. 7, it is described in detail below as how the management apparatus determines the quality guarantee to each pair of service nodes in accordance with the input operational strategies. According to an embodiment of the present invention, the key to integrating the operational strategies is to define the value of "sensitivity". The value of "sensitivity" of each pair of service nodes is calculated with the following Formula 1.

[Formula 1]

$$\text{sensitivity} = \text{Control\_Level} \times \frac{\text{Delay\_Max}}{\max\{\sigma\}} \times \frac{\text{Delay\_Max} - \mu - \sigma}{\text{Delay\_Max}} \quad (1)$$

In Formula 1, "Delay_Max" and "Control Level" represent numerical values designated by the service provider as the "Maximal Delay" and the "Control Level". Further, "μ" and "σ" respectively represent the average value and the standard difference of the historical service delay of a pair of service nodes in which these two values are stored in the database shown in FIG. 8. Based on the "sensitivity" obtained by calculation, the delay threshold (guaranteed_delay), which defines the service quality guarantee level or non-regulation level of this pair of nodes, is calculated with the following Formula 2.

[Formula 2]

$$\text{guaranteed\_delay} = \mu + \text{sensitivity} \times \sigma \quad (2)$$

As shown in FIG. 4A, the delay threshold, which defines the non-regulation level, provides a criterion for determining whether to regulate participation (invitation) with respect to a user desiring to newly participate (be invited) in a session between a pair of service nodes. More specifically, in a case where the delay of a one-way path from one node to another node is no greater than the delay threshold that defines the non-regulation level, no regulation is performed on the signals transmitted through the one-way path. On the other hand, in a case where the delay of the one-way path is no less than the delay threshold that defines the non-regulation level, the signals transmitted through the one-way path are regulated to some degree. In FIG. 4A, "safe range" indicates a state of delay is measured only where the delay is no greater than the delay threshold defining the non-regulation level (i.e. a state where participation (invitation) to a session is not denied).

The "sensitivity" obtained by the calculation and the corresponding service quality guarantee are stored in a database. At this time, the service provider can select to macroscopically or microscopically check the statistical value of quality guarantee of the whole network and the quality guarantee of each pair of service nodes. The service provider may also designate a specific quality guarantee (Delay_SLA) with respect to a specific pair of service nodes. When this guarantee is better than the guarantee obtained by the Formula 2, the "sensitivity" is calculated again with the following Formula 3 in accordance with the designated guarantee.

[Formula 3]

$$\text{sensitivity} = \frac{\text{Delay\_SLA} - \mu}{\sigma} \qquad (3)$$

The setup by the service provider is reflected in the "sensitivity". Another characteristic of the "sensitivity" is that, with the same setup (the same Delay_Max and Control_Level), the better the historical service quality is, the more sensitive will the "sensitivity" be with respect to the pair of service nodes. Therefore, historical service quality is also taken into consideration in quality management. This will be further explained in detail in the below section of the monitoring apparatus.

Figure 5:
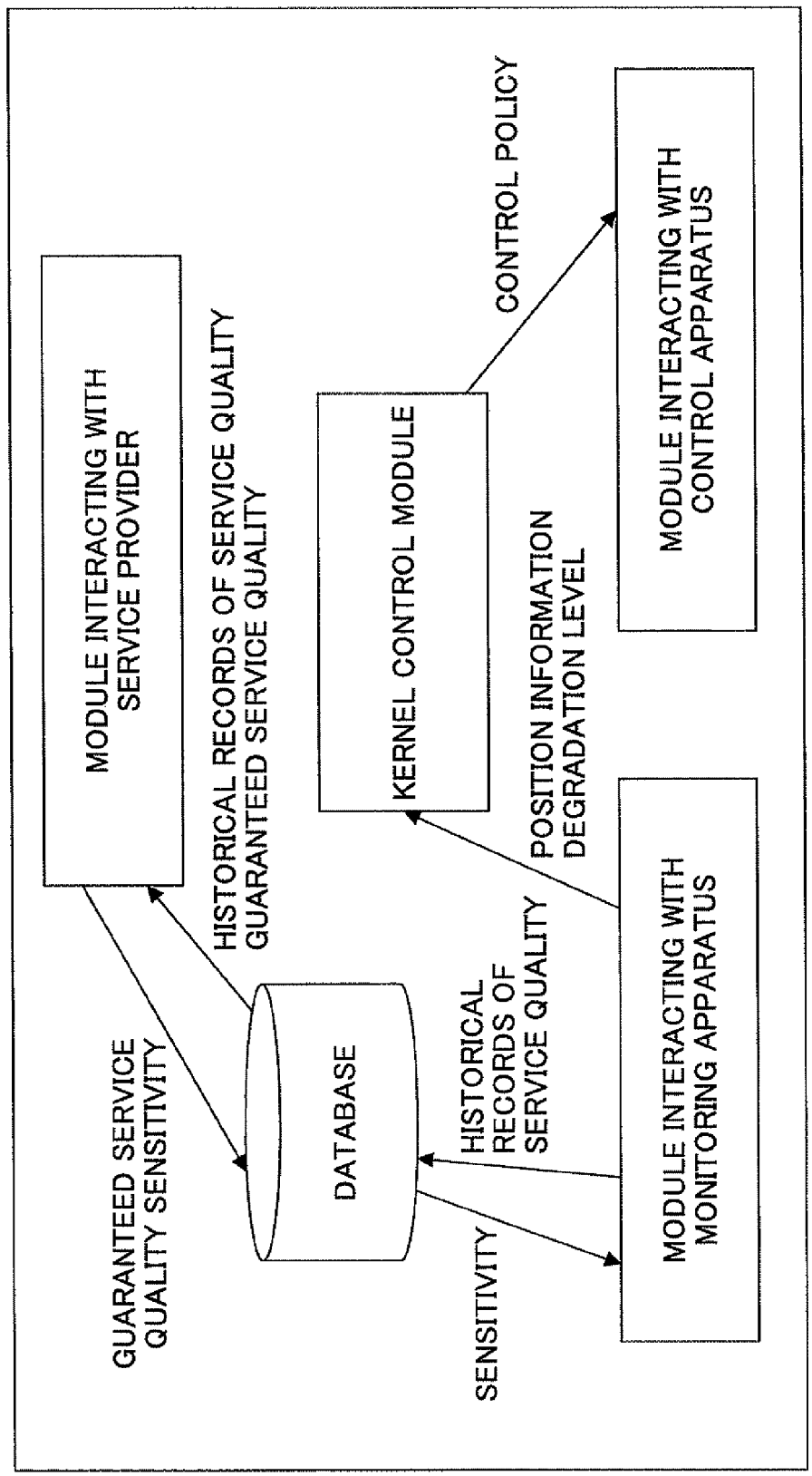
FIG. 5 is a block diagram showing a configuration of a management apparatus according to an embodiment of the present invention.

After the setup is finished, the "sensitivity" of each pair of service nodes is transmitted to the corresponding monitoring apparatus by a module interacting (exchanging information) with the monitoring apparatus in FIG. 5.

<Control Policy>

Described below is how the management apparatus forms (sets) and modifies (adjusts) a control policy in accordance with a message (report) from a monitoring apparatus for realizing service guarantee. The message from the monitoring apparatus includes the following sections of: "node information" that indicates where the service quality has changed; "degradation level" that indicates a numeral value representing the degree of degradation of service quality; and "message classification" that indicates the type of the message. The message is classified into the following three types.

The first type is an "alarm message".

When an alarm message arrives, the management apparatus learns (realizes) where the quality degrades in accordance with the "node information" in the message. The management apparatus also learns (realizes) the degree (level) of the quality degradation in accordance with the "degradation level". Thereby, the management apparatus forms (sets) a control policy.

The second type is an "update message". When an update message arrives, the management apparatus learns (realizes) from the report where the service quality degradation is increased or reduced, to thereby modify the control policy.

The third type is an "alarm clearing message". When an alarm clearing message arrives, the management apparatus learns (realizes) from the report which service quality has already recovered, to thereby modify the control policy.

As described above, the management apparatus correspondingly sets and adjusts the control policy in accordance with the changes of the service quality. Furthermore, the control policy is transmitted to the control apparatus by a "module interacting (exchanging information) with the control apparatus" in FIG. 5.

DETAILED EXAMPLE

Figure 9A:
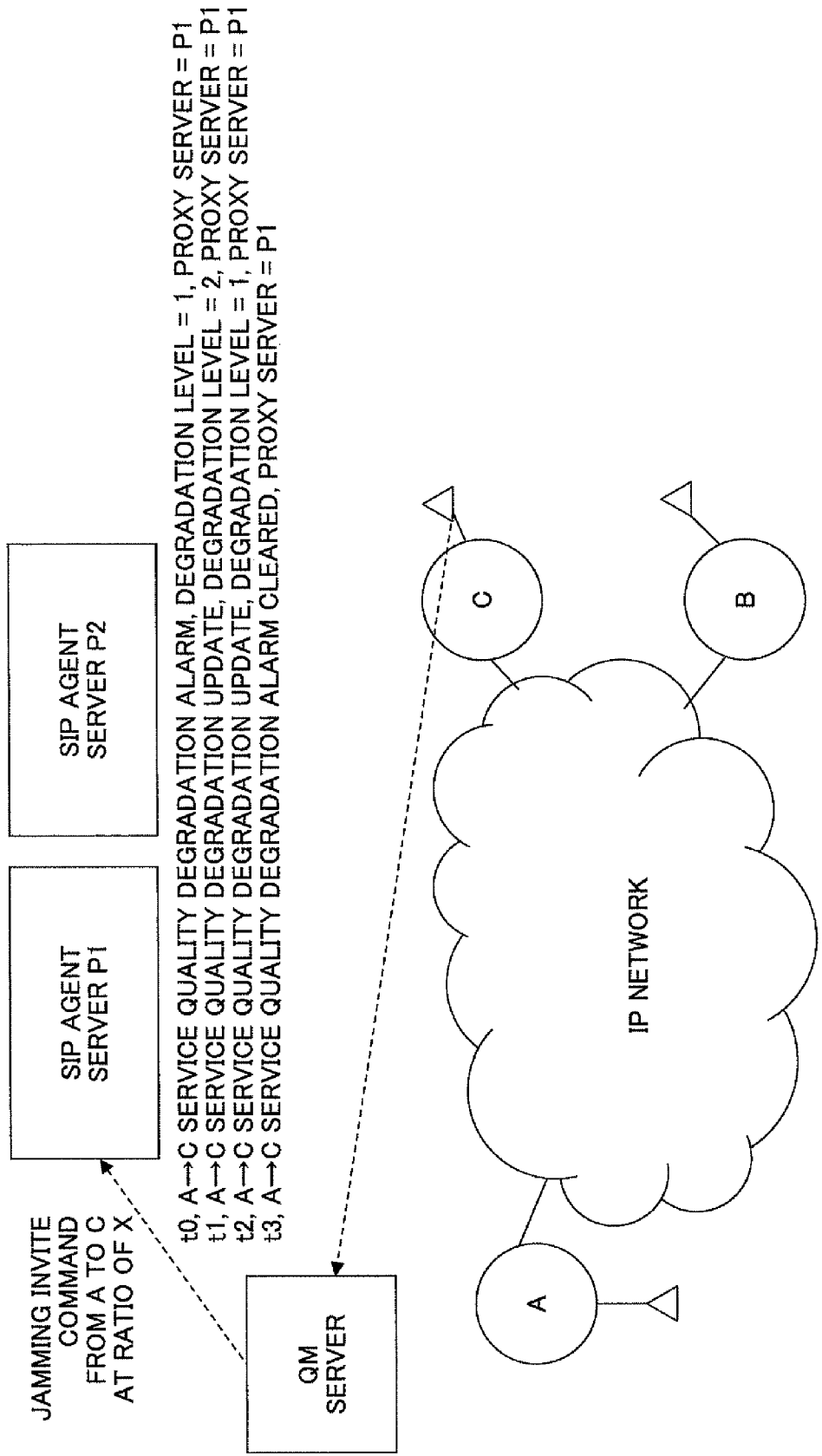
FIG. 9A is a schematic diagram showing a manner in which degradation of service quality is detected according to an embodiment of the present invention.

As an exemplary application of the present invention, FIG. 9A shows an example illustrating how a service management system manages a VoIP service. In the network shown in FIG. 9A, the historical service qualities from Region A to Region C and from Region A to Region B are shown in the following Table 1.

TABLE 1

| SERVICE NODE | AVERAGE VALUE OF DELAY | STANDARD DIFFERENCE OF DELAY |
|---|---|---|
| FROM REGION A TO REGION C | 8 ms | 2 ms |
| FROM REGION A TO REGION B | 20 ms | 5 ms |

In this example, the acceptable maximal delay designated by the VoIP service provider is 100 ms, and the control level designated by the VoIP service provider is 0.3. According to the above-described Formula 1, the "sensitivity" of the path extending from Region A to Region C is:

0.3×(100/5)×(100−8−2)/100=5.4 [ms].

Here, there is used "max {σ}=max {2,5}=5". Likewise, the "sensitivity" of the path extending from Region A to Region B is:

0.3×(100/5)×(100−20−5)/100=4.5 [ms].

Furthermore, according to the above-described Formula 2, the delay threshold defining the non-regulation level of the path extending from Region A to Region C is:

8+5.4×2=18.8 [ms].

Likewise, the delay threshold defining the non-regulation level of the path extending from Region A to Region B is:

20+4.5×5=42.5 [ms]

At this stage, the setup of the management system is completed, and the "sensitivity" is transmitted to the monitoring apparatuses at Region B and Region C.

Next, based on the delay threshold provided in correspondence with each one-way path, one or more degradation levels "i" are obtained (i=0, 1, . . . ). In this example, three degradation levels (i=0, 1, 2) are prepared with respect to each one-way path extending from Region A to Region C and from Region A to B according to the following Formula A. It is to be noted that, in this example, i=0 corresponds to the non-regulation level. The number of degradation levels is not limited to three level. More or less degradation levels may be prepared.

$$\text{Upper\_boundary}_{degradation\_level=i} = \text{Upper\_boundary} \times (1+\text{Adjust\_level})^i \qquad [\text{Formula A}]$$

In Formula A according to an embodiment of the present invention, "Upper_boundary$_{degradation\_level=i}$" indicates the delay threshold of the $i^{th}$ degradation level, "Upper_boundary" indicates the delay threshold defining the non-regulation level, and "Adjust_level" indicates a predetermined parameter, for example, 0.1.

As shown in FIG. 4B, with respect to the one-way path from Region A to Region C, delay thresholds defining three types of degradation levels are prepared as follows:

$18.8 \times (1+0.1)^0 = 18.8$ [ms] (i=0);

$18.8 \times (1+0.1)^1 = 20.68$ [ms] (i=1); and $18.8 \times (1+0.1)^2 = 22.74$ [ms] (i=2).

As shown in FIG. 4C, with respect to the one-way path from Region A to Region B, delay thresholds defining three types of degradation levels are prepared as follows:

$42.5 \times (1+0.1)^0 = 42.5$ [ms] (i=0);

$42.5 \times (1+0.1)^1 = 61.83$ [ms] (i=1); and $42.5 \times (1+0.1)^2 = 93.4$ [ms] (i=2).

Next, an example of an operation of changing the regulation ratio in correspondence with various degradation levels is described with reference to FIG. 4D. As one exemplary case, Region C (agent belonging to Region C but referred to as Region C for the sake of convenience) measures the packet transmission delay time based on RTP packets transmitted from Region A. In this case, delay time is measured for each packet where packets arrive every 20 ms. FIG. 4D shows the measured delay time along with the passing of time. The Region C is to appropriately report the degradation level corresponding to the status of its' node (i.e. whether the degradation parameter i corresponds to 0, 1, or 2) to the QM server. In this case, it is theoretically possible to report to the QM server whenever an instantaneously measured value of delay time is obtained. However, as shown in FIG. 4D, since the amount of change of adjacent instantaneous values (vertical axis) reaches up to several milliseconds, there is a high possibility that the degradation level corresponding to each instantaneous value changes frequently. In such a case, supposing that Region C reports the degradation level in correspondence with the changes of the instantaneous values to the QM server, the QM server would have to heavily perform control the regulating of sessions at a high rate (ratio) in correspondence with the heavily frequently changing degradation level. This is not only meaningless, but is also an excessively heavy load for control. Therefore, in this embodiment of the present invention, rather than having to report change of degradation level to the QM server whenever an instantaneous measured value of delay time is obtained, the change of degradation level is reported to the QM server only when the change of degradation level is greater than a predetermined rate. The detailed criteria and values in determining the changing of status are described below.

Given at a time t0, the management apparatus (QM server) receives a message from the monitoring apparatus at Region C reporting the quality degradation of VoIP service from Region A to Region C in that the level of degradation is 1 (i=1) and that the SIP proxy server of the VoIP service is P1. Upon receipt of such report, the management apparatus regulates (denies) new calls from Region A to Region C at a regulation ratio corresponding to the degradation level i=1, to thereby reduce the traffic of the network and recover the quality of the service. The ratio of the regulated (denied) calls is:

$1 - 1/R^{degradation\_level}$; wherein "degradation_level" indicates the degradation level (severity_level) reported by the monitoring apparatus and "R" indicates a constant greater than 1 whose specific numerical value is decided by the service provider. For example, supposing that "R" is 1.8, since $1-1/R^1 = 0.44$, 44% of the new calls from Region A to Region C will be regulated (denied). This control policy is converted into a setup command for the SIP agent server and sent to the P1 server.

Given at a time t1 (t1>0), the management apparatus (QM server) receives a message from the monitoring apparatus at Region C reporting an update message indicating that the level of quality degradation of the VoIP service from Region A to Region C has increased to 2. On the basis of this update message, the management apparatus realizes that the current control policy cannot prevent the service quality from further degrading. Therefore, the management apparatus updates the regulation ratio to 69% ($1-1/1.8^2 = 0.69$).

Given at a time t2 (t2>t1), the management apparatus receives a message reporting an update message indicating that the level of quality degradation of the VoIP service from Region A to Region C has decreased to 1. In this case, the management apparatus lowers the regulation ratio to 44% ($1-1/1.8 = 0.44$).

Finally, given at a time t3 (t3>t2), the management apparatus receives an alarm clearing message of this service. That is, when it is determined that the degradation level i has reached 0, the management apparatus releases the regulation on the new calls or sessions so that the new calls can be setup without being subject to regulation. In this embodiment of the present invention, the agent of each region determines the degradation level (i=0, 1, 2) to which the current communication status of each corresponding region belongs to. Accordingly, the regulation (including regulation of 0%) corresponding to the determined degradation level is applied. The changes of status may be determined in accordance with not by a single instantaneous sample but by the average of plural samples. Since the QM server needs only to perform session management according to stable (steady) status change, the QM server does not have to unnecessarily frequently control operation in correspondence with instantaneous status change.

<Monitoring Apparatus>

FIG. 3 shows a monitoring apparatus typical to an embodiment of the present invention. The monitoring apparatus includes the following four modules.

The first module is a transmitting module. This module is for transmitting emulated service flows to other monitoring apparatuses. These service flows emulate the network service under quality management. For example, when the service managed is VoIP, the service flow transmitted by the monitoring apparatus is a VoIP service flow.

The second module is a receiving module. This module is for receiving the arriving emulated service flows, calculating service delay undergone by the emulated service flows, and transmitting the calculated service delay together with information of the sender (transmitter)/receiver to a detecting module.

The third module is a detecting module. This module is for detecting degradation of service quality and transmitting an alarm message, an update message, or an alarm clearing message. The detecting module is realized based on "quality variation detection (quality change detection)" technology according to an embodiment of the present invention (described below). The detecting module also controls whether to further transmit the obtained service delay and the information of the sender (transmitter)/receiver to a recording module. The criterion for deciding whether to transmit is whether there is an active alarm with respect to the sender/receiver when the information arrives. The transmission is performed if there is no such alarm.

The fourth module is a recording module. This module is for maintaining and updating the historical records of service quality. The historical records are, for example, the average value and the standard difference of delay. The management apparatus can read out (extract) these records from the recording module and can also use these records to update the historical records used in the detecting module.

According to an embodiment of the present invention, among the four modules mentioned above, the detecting module is the most important. One of the essences of this module is the "quality variation detection" technology according to an embodiment of the present invention.

<Safe Range>

This technology delimits a "safe range" for the service quality under monitoring. The upper boundary of the "safe range" is the quality guarantee provided for the service. When the service quality of a certain pair of nodes deviates from its "safe range", it is regarded that the service quality of this pair of nodes has degraded. When degradation occurs, the variations of service quality are generalized as variations of degradation level. FIG. 4E is an example with which to explain this technology. Before time t1, even if service quality varies incessantly, these variations all fall within the "safe range". Accordingly, in this method, it is determined that quality has not changed (degraded). At time t1, this technology detects that the service quality has deviated from the "safe range". Then, at time t2, this technology detects that the service quality has further degraded. Then, at time t3, this technology detects that the service quality has recovered to a certain degree. Finally, at time t4, this technology detects that the service quality has returned to the safe range. Thus, this technology regards that the service quality has completely recovered. The details of implementation of this technology are described in detail below.

First, detection of deviation from/returning to the "safe range" is described. The varying (changing) of the service quality of the network is instantaneous due to the influence of sporadic factors. Therefore, insofar as network service quality management is concerned, only stable variations of the service quality are meaningful since only stable quality degradation can indicate that a problem has occurred in the network. It is therefore one objective to distinguish stable variations from sporadic variations. Conventional technology usually makes use of a timer or a counter to achieve this objective. When the time of the quality degradation is longer than a threshold value designated by the timer or the counter, it is regarded that the degradation is stable; it is regarded that the degradation is temporary (unstable) when otherwise. This method has an obvious defect in that it is difficult to set a proper threshold values suitable for different networks or different circumstances of the service. Therefore, an embodiment of the present invention proposes a new method that distinguishes temporary service quality variations from stable quality variations. This method is based on hypothesis testing, and the rules for the detection of deviating from/returning to the "safe range" are as follows.

Detection rule 1: in N testing samples, if the values of the samples exceeding a percentage P_U exceed an upper boundary of the "safe range", it is considered that the monitored service quality to have deviated from the "safe range".

Detection rule 2: in N testing samples, if the values of the samples exceeding a percentage P_D are lower than the upper boundary of the "safe range", it is considered that the service quality to have returned to the "safe range".

According to the Chebyshev theorem, there is an inequality equation of:

"$P(|x-\mu| \geq k\sigma) \leq 1/k^2$"

with respect to a any random number "x", wherein "$\mu$" and "$\sigma$" are respectively the average value and the standard difference of "x", and "k" is a random positive number. The upper boundary of the "safe range" (i.e. delay threshold that defines the non-regulation level) is expressed as:

"$\mu$+sensitivity*$\sigma$".

Here, since "$\mu$" and "$\sigma$" are respectively the average value and the standard difference in the delay record, the values of P_U and P_D can be defined with the following Formula 4

[Formula 4]

$$P\_U = \begin{cases} \dfrac{1}{\text{sensitivity}^2} & (\text{sensitivity} > 2) \\ \dfrac{1}{(10 + \text{sensitivity})^2} & (\text{sensitivity} \leq 2) \end{cases} \quad (4)$$

$$P\_D = \begin{cases} 1 - \dfrac{1}{\text{sensitivity}^2} & (\text{sensitivity} > 2) \\ 1 - \dfrac{1}{(10 + \text{sensitivity})^2} & (\text{sensitivity} \leq 2) \end{cases}$$

In this system, it is a special circumstance for the "sensitivity" to be less than or equal to 2, which occurs only when the historical service records are worse than the service quality of the guarantee. Under this circumstance, detection is to be set to a hypersensitive level (P_U<1%), so as to ensure the required service quality.

<Detection of Variations of Quality Degradation>

Next, detection of variations of quality degradation is described. As described above, after service quality degradation is detected, variations of service quality are indicated as variations of the values of the degradation_level (severity_level), reported to the management apparatus, and used as the basis for setting or adjusting the control policy. In order to detect the variations of the degradation level, an upper boundary of the service quality is defined with the following Formula 5 with respect to each degradation level "i" ("i" is an integer and greater than 0).

[Formula 5]

Upper_boundary$_{severity\_level=i}$=Upper_boundary×(1+ Adjust_level)$^i$ (5)

In Formula 5, "Upper_boundary" is the upper boundary of the "safe range" (delay threshold that defines the non-regulation level), and "Adjust_level" is a control parameter of the granularity with which a control device sends a message to the management apparatus. If the monitored service delay is located within a region delimited by the upper boundary of the degradation level "i" and the upper boundary of the degradation level "i−1", it is regarded that the degradation level of the service quality to be "i". The detection of deviating from/returning to this region is also based on hypothesis testing, whose rules are as follows:

Detection Rule 1: when the degradation level is "i" (i>0), in N testing samples, if the delays exceeding the percentage P_U_L$_{degradation\_level=i}$ exceed an upper boundary (delay threshold that defines the degradation level i) "Upper_boundary×(1+Adjust_level)$^i$", it is regarded that service quality has further degraded, and the corresponding degradation level is represented as "i+1".

Detection Rule 2: when the degradation level is "i" (i≧1), in N testing samples, if the delays exceeding a percentage P_D_L$_{degradation\_level=i}$ are lower than the upper boundary (delay threshold that defines the degradation level i−1) "Upper_boundary×(1+Adjust_level)$^{i-1}$", it is regarded that service quality has lessened, and the corresponding degradation level is represented as "i−1".

According to the characteristics of the service delay in the packet network, $P\_U\_L_{degradation\ level=i}$ and $P\_D\_L_{degradation\ level=i}$ are defined as follows with respect to each degradation level i.

[Formula 6]

$$P\_U\_L_{severity\_level=i} = \frac{P\_U}{(1+\text{Adjust\_Level})^i} \quad (i>0) \quad (6)$$

$$P\_D\_L_{severity\_level=i} = \frac{P\_D}{(1+\text{Adjust\_Level})^{i-1}} \quad (i \geq 1)$$

<Example of Calculating Quality Degradation Level>

Described below is an example showing how the above-described Detection Rules 1 and 2 are applied to variations (transitions) of the status of degradation level by using the exemplary values used in the above-described <Detailed Example>. In the above-described Detection Rule 1, the percentage $P\_U\_L_{degradation\_level=i}$ and the value of the delay threshold "Upper_boundary×(1+Adjust_level)$^i$" are used for determining degradation level. In the above-described Detection Rule 2, the percentage $P\_D\_L_{degradation\_level=i}$ and the value of the delay threshold "Upper_boundary×(1+Adjust_level)$^{i-1}$" are used for determining degradation level. In the case of the above-described exemplary values, the values of these parameters would be represented as shown in FIG. 9B.

Here, the Detections Rules 1 and 2 are applied to the statuses before and after the respective time t0 through t3 shown in FIG. 4D. First, at the time t0, it is given that delay time is measured whenever receiving RTP packets at Region C and that N instantaneous samples of time delay are obtained. Further, it is given that $k_0$ is the number of samples exhibiting time delay deviating from the region corresponding to degradation level "i=0". In this case, as shown in FIG. 4D, the degradation level changes from "i=0" to "i=1" when a relationship of "$(k_0/N) > P\_U\_L_{degradation\_level=0}$" is satisfied.

Then, at the time t1, it is given that N instantaneous samples of time delay are obtained and that $k_1$ is the number of samples exhibiting time delay significantly deviating from the region corresponding to degradation level "i=1". In this case, as shown in FIG. 4D, the degradation level changes from "i=1" to "i=2" when a relationship of "$(k_1/N) > P\_U\_L_{degradation\_level=1}$" is satisfied. On the other hand, it is given that $k_1$ is the number of samples exhibiting time delay so as not to reach the region corresponding to degradation level "i=1". In this case, the degradation level changes from "i=1" to "i=0" when a relationship of "$(k_1/N) > P\_D\_L_{degradation\_level=1}$" is satisfied.

Then, at the time t2, it is given that N instantaneous samples of time delay are obtained and that $k_2$ is the number of samples exhibiting time delay significantly deviating from the region corresponding to degradation level "i=2". In this case, as shown in FIG. 4D, the degradation level changes from "i=2" to "i=3" when a relationship of "$(k_2/N) > P\_U\_L_{degradation\_level=2}$" is satisfied. On the other hand, it is given that $k_2$ is the number of samples exhibiting time delay so as not to reach the region corresponding to degradation level "i=2". In this case, the degradation level changes from "i=2" to "i=1" when a relationship of "$(k_2/N) > P\_D\_L_{degradation\_level=2}$" is satisfied.

Then, at the time t3, it is given that N instantaneous samples of time delay are obtained and that $k_3$ is the number of samples exhibiting time delay significantly deviating from the region corresponding to degradation level "i=1". In this case, as shown in FIG. 4D, the degradation level changes from "i=1" to "i=2" when a relationship of "$(k_3/N) > P\_U\_L_{degradation\_level=1}$" is satisfied. On the other hand, it is given that $k_3$ is the number of samples exhibiting time delay so as not to reach the region corresponding to degradation level "i=1". In this case, the degradation level changes from "i=1" to "i=0" when a relationship of "$(k_3/N) > P\_D\_L_{degradation\_level=1}$" is satisfied.

In the manner described above, variations (transitions) in the status of degradation level are determined with respect to each region. According to an embodiment of the present invention, after N instantaneous samples are obtained for a given degradation level "i", the above-described detection rules are applied to a subsequent degradation level. The subsequent degradation level is, for example, "i±1" or "i". Therefore, even in a case where more than two degradation levels are prepared, variation (transition) of degradation level may be determined by the two rules of Detection Rule 1 (determining whether degradation level further degrades) and Detection Rule 2 (determining whether degradation level improves to a better degradation level).

Figure 10:
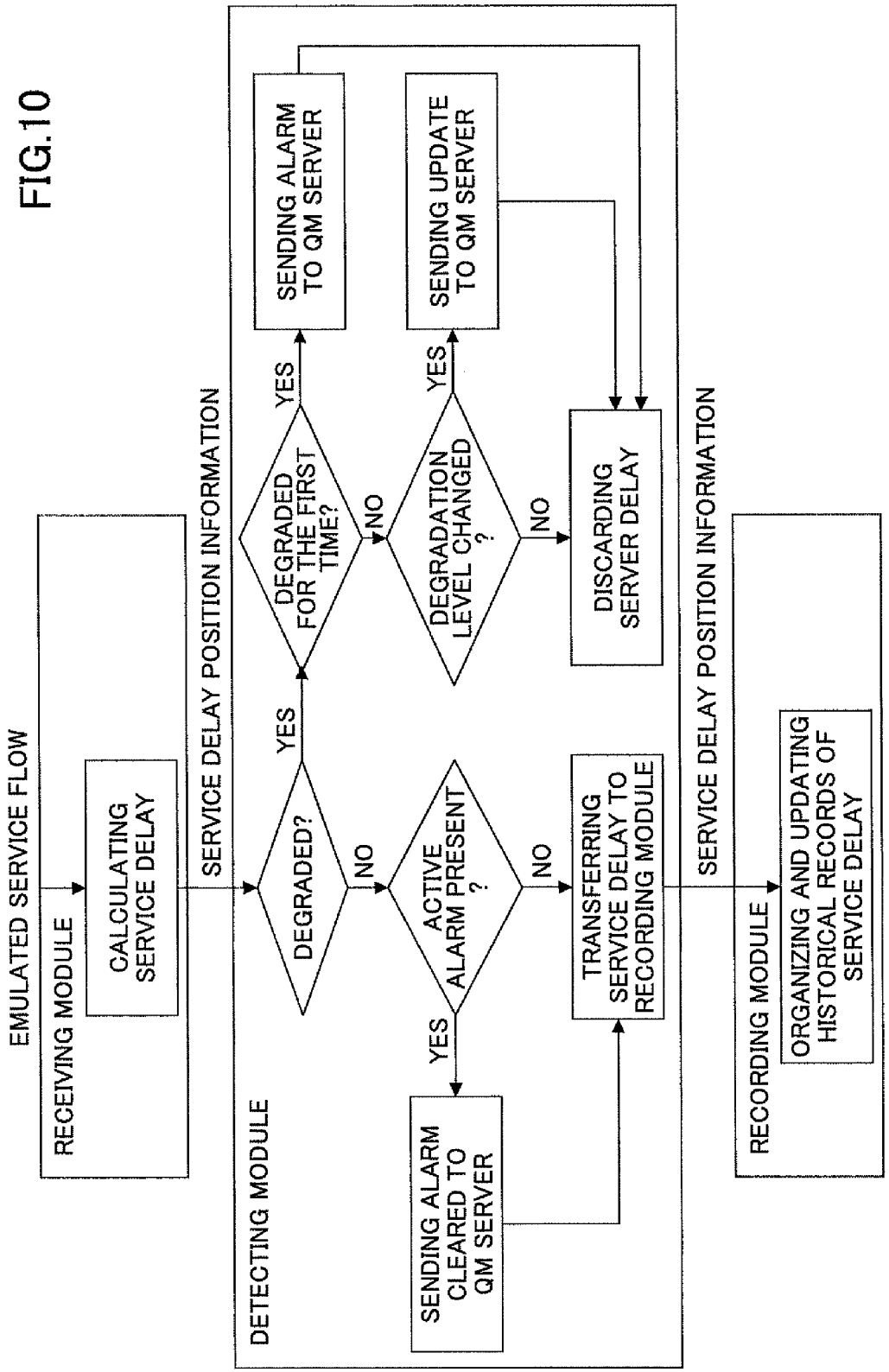
FIG. 10 is an operational flowchart of a monitoring apparatus according to an embodiment of the present invention.

Detailed explanations are made above with regard to one of the essential aspects of the detecting apparatus, namely the "quality variation detection" technology. The operational flow of the monitoring apparatus according to an embodiment of the present invention is shown in FIG. 10.

<Summation>

As shown in FIG. 1, according to an embodiment of the present invention, the task of the control apparatus(es) is to execute a command from the management apparatus. The control apparatuses are those devices that have already been deployed (arranged) in the network for support of the network service, such as the SIP agent server (proxy server) for support of the VoIP services. One of the characteristics of these control apparatuses is that they are capable of providing a certain control to the network service for which they support. For example, the SIP agent server can control the call access of the VoIP, etc. The management apparatus according to an embodiment of the present invention sets a control policy (control policies) in accordance with a control function or a control mechanism provided by the control apparatus, to thereby achieve quality management. From an aspect of development, the control apparatus may also be a control server that controls MPLS/QoS if the network wholly supports MPLS/QoS technology. Under such circumstance, the management apparatus sets the control policy (control policies) in accordance with such control functions provided by the MPLS/QoS control server (e.g., classifying the flow (flow amount) or specifying (indicating) the routing) and applies the same to the server for achieving the objective of quality management.

Embodiments of the present invention provide a method, a system, a program, and a readable storage medium (readable recording medium) directed to quality management. An embodiment of the present invention actively monitors the service quality of the network, and provides quality guarantee in accordance with the operational strategies of the service provider and the historical service quality. A solution proposed by an embodiment of the present invention includes three links (schemes), i.e. of measurement, detection, and control. In comparison with a conventional art, each link (scheme) of the embodiment of the present invention possesses its own peculiar characteristics and advantages. (Measurement Technology): The conventional measurement technology either measures the average network performance with a time period or measures the network performance before a service flow starts. Such measurement technology cannot measure the quality of the service network in real time. Whereas the measurement technology according to an embodiment of the present invention measures service quality in real time between monitored points by uninterruptedly transmitting emulated service flows. Therefore, the measurement technology according to the embodiment of the present invention can find variations (changes) of service quality more quickly and precisely.

(Detection Technology): During monitoring of service quality, how to determine the bottom line of service and quality and hence determine degradation and recovery of service quality is one of the most important aspects. In a conventional art, the bottom line of service quality is usually determined by either one of the following two modes: 1) historical service quality, and 2) invariant parameter value. In the first mode, variations of service quality are restricted within the historical variations, and degradation is considered to have occurred once the variations exceed the historical variations. However, service quality may still actually be good even where the variations exceed the historical variations. In the actual networks, since service quality changes frequently, the "excessive control" engendered by this mode not only greatly increases additional control load but at the same time affects the throughput of the network. Meanwhile, the second mode determines degradation to have occurred only when the service quality is worse than a predetermined parameter value. This mode neglects the fact that service qualities of the same network might be different between service node pairs or at different time periods of the same pair of nodes. For example, although it may be normal to increase the delay by 10 ms for a pair of nodes whose service delay is usually 50 ms to 60 ms, the same variation may be a sign of severe service quality degradation for a pair of nodes whose service delay is usually 5 ms to 10 ms. Therefore, since such a mode with a predetermined parameter value neglects the differences in regionality and timeliness of network service quality, it may be referred to as a "post-reaction" system, in other words, it alerts degradation only after the service quality has severely degraded, thus guarantee of service quality cannot be achieved. The detection technology according to an embodiment of the present invention automatically sets different quality bottom lines for different pairs of nodes in accordance with the historical service quality of different pairs of service nodes and the operational strategies of the service provider, and dynamically adjusts the bottom lines in accordance with the variations (changes) of service quality. Therefore, the detection technology according to the embodiment of the present invention incorporates advantages of the conventional detection technologies and is not only capable of forecasting severe degradation of service quality but is also capable of providing the service provider with a possibility of managing service quality according to its desire.

(Control Technology): In the control process according to an embodiment of the present invention, a central management server is notified only when variation of service quality reaches such a degree as to require adjustment of control policy. Furthermore, this notification directly points out as how to adjust the control policy. Whereas in a conventional art, the central management server has to actively measure service quality and analyze the variation of the service quality, and only then decides as how to adjust the control policy.

In comparison with the conventional art, the control technology according to the embodiment of the present invention can significantly reduce the load of the control server and adjust the control policy more effectively.

The method, system, and program according to an embodiment of the present invention have the following advantages.

Suitability to large-scale networks: The central management server merely takes charge of setting and adjusting the control policy. By comparison, conventional systems such as the Callmanager of CISCO can only be applied on a small scale due to its processing capability being restricted by the central management server having to process every service flow.

Higher control efficiency and more flexible setup: The service provider can flexibly set up the quality management in accordance with its own operational strategies. Furthermore, in the control process, the control policy is dynamically adjusted according to variations of the status of the network, to thereby achieve higher efficiency of control.

Simple implementation: This system can provide service quality guarantee in real time only by access control of the service flow level. It does not require network devices such as a router for providing support. Therefore, this system can be easily incorporated into existing networks without having to perform any update or modification on the devices of the existing networks.

An embodiment of the present invention provides a method for guaranteeing a service quality of a network service (network service quality guaranteeing method), the method including the steps of: storing a historical record of a network service quality; inputting an acceptable maximal service delay of the network service; inputting a desired control level between the service quality of the network service and the number of users of the network service; determining the content of service quality guarantee, which can be provided to each service node, with respect to each pair of service nodes in accordance with the historical record, the maximal service delay, and the control level between the service quality and the number of users; monitoring the service quality between a corresponding pair of service nodes in accordance with the content of service quality guarantee; and regulating the network service between a pair of service nodes in a case where degradation of service quality occurs between the pair of service nodes.

Furthermore, the network service quality guaranteeing method according to an embodiment of the present invention further includes a step of checking the content of service quality guarantee of each pair of service nodes in the network and a step of independently modifying the content of service quality guarantee of a predetermined pair of service nodes.

Furthermore, in the network service quality guaranteeing method according to an embodiment of the present invention, the step of monitoring the service quality between the corresponding pair of service nodes includes a step of monitoring the occurrence of service quality degradation between the corresponding pair of service nodes and the degree of the service quality degradation, wherein a control policy for the network service between the pair of service nodes are adjusted in a case where variation of service quality occurs to the degree of the service quality degradation.

Furthermore, in the network service quality guaranteeing method according to an embodiment of the present invention, emulated service flows are transmitted between each of the service nodes, wherein the service quality between the corresponding pair of service nodes is monitored in real time.

Furthermore, in the network service quality guaranteeing method according to an embodiment of the present invention, the historical record of the network service quality includes a historical record of a network service quality between each pair of service nodes in the network.

Furthermore, in the network service quality guaranteeing method according to an embodiment of the present invention, the pair of service nodes includes a pair of nodes between two cities, a pair of nodes between two local area networks, or a pair of nodes between two buildings.

Furthermore, in the network service quality guaranteeing method according to an embodiment of the present invention, wherein the network service quality between the pair of service nodes is measured according to the quality of the emulated service flows received at each service node.

Furthermore, in the network service quality guaranteeing method according to an embodiment of the present invention, when a variation occurs in the historical record of the network service quality between the pair of service nodes, the service quality guarantee for the service node is correspondingly adjusted in accordance with the acceptable maximal service delay of the network service, the desired control level between the service quality of the network service and the number of users, and the varied historical record of the network service quality.

Furthermore, in the network service quality guaranteeing method according to an embodiment of the present invention, the step of monitoring the service quality between a corresponding pair of service nodes further includes a step of setting a safe range of service quality, a step of determining whether the service quality of a predetermined pair of service nodes deviates from or returns to the safe range based on hypothesis testing, wherein the service quality of the predetermined pair of service nodes is determined to have degraded in a case where the service quality of the predetermined pair of service nodes deviates from the safe range.

Furthermore, in the network service quality guaranteeing method according to an embodiment of the present invention, when service quality degradation is detected, variations (changes) of service quality are represented by variations (changes) of values of the degree of degradation and reported, wherein the control policy for the network service of the pair of service nodes is adjusted according to the report.

Furthermore, in the network service quality guaranteeing method according to an embodiment of the present invention, the degree of service quality degradation is classified as increasing tendency (aggravated), decreasing tendency (lessened), and completely recovered, wherein when service quality degradation is detected, variations (changes) of service quality are represented by variations (changes) of degree of service quality degradation and reported.

Furthermore, in the network service quality guaranteeing method according to an embodiment of the present invention, the adjusting of the control policy for the network service of the pair of service nodes includes preventing degradation exceeding the acceptable maximal service delay of the network service by using a stricter control policy when the degree of degradation exhibits an increasing tendency and reducing the influence on an end user by using a looser control policy when the degree of degradation exhibits a decreasing tendency.

Furthermore, in the network service quality guaranteeing method according to an embodiment of the present invention, the adjusting of the control policy for the network service of the pair of service nodes includes adjusting a parameter of a control mechanism, adjusting the type, position, and number of control apparatuses of an application control policy, and adjusting a called control mechanism.

Another embodiment of the present invention provides a system for guaranteeing a service quality of a network service (network service quality guaranteeing system), the system having a management apparatus, a monitoring apparatus, a control apparatus, wherein the management apparatus is connected to the monitoring apparatus and the control apparatus via a network, wherein the management apparatus includes a memory unit for storing a historical record of a network service quality, an input unit for inputting an acceptable maximal service delay of the network service delay and a control level between the service quality of the network service and the number of users of the network service, a service quality guarantee generating unit for obtaining a service quality which can be provided to the network service between each pair of service nodes in the network in accordance with the historical record, the maximal service delay, and the control level between the service quality and the number of users, and an information exchanging unit (interaction unit) for exchanging information between the monitoring apparatus and the control apparatus, wherein the monitoring apparatus monitors the network service quality between a corresponding pair of service nodes in real time in accordance with the service quality guarantee and reporting occurrence of degradation of the service quality between a pair of service node when the degradation occurs, wherein the control apparatus regulates the network service between a pair of service nodes upon receiving a command from the management apparatus.

Furthermore, in the network service quality guaranteeing system according to an embodiment of the present invention, the inputting unit includes a first inputting unit for inputting the acceptable maximal service delay of the network service, a second inputting unit for inputting a desired control level between the service quality of the network service and the number of users, and a third inputting unit for displaying the content of service quality guarantee of each pair of service nodes in the network and independently modifying the content of service quality guarantee of a predetermined pair of service nodes.

Furthermore, in the network service quality guaranteeing system according to an embodiment of the present invention, the monitoring apparatus includes plural monitoring apparatuses, wherein each monitoring apparatus is connected to a corresponding service node, wherein the monitoring apparatus includes a transmitting unit for transmitting an emulated service flow, which emulates the network service, to another monitoring apparatus, a receiving unit for receiving the transmitted emulated service flow, calculating the service delay of the emulated service flow, and transferring the calculated service delay together with information of a transmitter/receiver to a detection unit, the detection unit for detecting degradation of the service quality and transmitting an alarm message, an update message, and an alarm clearing message, and a memory unit for maintaining/updating the historical record of the service quality.

Furthermore, in the network service quality guaranteeing system according to an embodiment of the present invention, the detecting unit includes a quality change detecting module, wherein the quality change detecting module sets a safe range of service quality and determines whether the service quality of a predetermined pair of service nodes deviates from or returns to the safe range based on hypothesis testing, wherein the service quality of the predetermined pair of service nodes is determined to have degraded in a case where the service quality of the predetermined pair of service nodes deviates from the safe range.

Furthermore, in the network service quality guaranteeing system according to an embodiment of the present invention, when the quality change detecting module detects service quality degradation, changes of service quality are represented by changes of values of the degree of degradation and reported to the management apparatus, wherein the management apparatus adjusts the control policy for the network service of the pair of service nodes.

Furthermore, in the network service quality guaranteeing system according to an embodiment of the present invention, the monitoring apparatus monitors whether degradation of service quality has occurred and reports occurrence of degradation of the service quality when the degradation occurs, wherein when the management apparatus receives an alarm reporting degradation of service quality, the management apparatus sets a control policy in accordance with a control mechanism provided by the control apparatus and notifies the set control policy to the control apparatus, wherein when the alarm of quality degradation is transmitted by the monitoring apparatus, the monitoring apparatus measures the change of service quality in real time and notifies change of service quality exhibiting a degree of quality degradation in a form of an update message, wherein the management apparatus, upon receiving the update message, correspondingly adjusts the control policy in accordance with the change exhibiting the degree of quality degradation, and notifying the adjustment to the control apparatus.

Furthermore, in the network service quality guaranteeing system according to an embodiment of the present invention, the degradation level of service quality is classified into plural ranges, wherein the regulation rate, which differs according to the plural ranges, is applied according to the range to which each service node belongs.

Furthermore, in the network service quality guaranteeing system according to an embodiment of the present invention, in a case where the management apparatus manages the degradation level of service quality between a pair of service nodes so that it belongs to a certain region, the degradation level between the pair of service nodes is updated to belong to another region when the value of an instantaneous service quality measured from at least one of the pair of service nodes exceeds a predetermined frequency and belongs to the other region.

Another embodiment of the present invention provides a program for guaranteeing a service quality of a network service (network service quality guaranteeing program), the program causing a network service quality guaranteeing system to execute the functions of: storing a historical record of a network service quality; inputting an acceptable maximal service delay of the network service; inputting a desired control level between the service quality of the network service and the number of users of the network service; determining the content of service quality guarantee, which can be provided to each service node, with respect to each pair of service nodes in accordance with the historical record, the maximal service delay, and the control level between the service quality and the number of users; monitoring the service quality between a corresponding pair of service nodes in accordance with the content of service quality guarantee; and regulating the network service between a pair of service nodes in a case where degradation of service quality occurs between the pair of service nodes.

Furthermore, the network service quality guaranteeing program according to an embodiment of the present invention further causes the network service quality guaranteeing system to execute the functions of checking the content of service quality guarantee of each pair of service nodes in the network and independently modifying the content of service quality guarantee of a predetermined pair of service nodes.

Furthermore, in the network service quality guaranteeing program according to an embodiment of the present invention, the function of monitoring the service quality between the corresponding pair of service nodes includes a function of monitoring the occurrence of service quality degradation between the corresponding pair of service nodes and the degree of the service quality degradation, wherein a control policy for the network service between the pair of service nodes are adjusted in a case where change of service quality occurs to the degree of the service quality degradation.

Another embodiment of the present invention provides a storage medium for guaranteeing a service quality of a network service (network service quality guaranteeing program storage medium, the storage medium storing a program causing a network service quality guaranteeing system to execute the steps of: storing a historical record of a network service quality; inputting an acceptable maximal service delay of the network service; inputting a desired control level between the service quality of the network service and the number of users of the network service; determining the content of service quality guarantee, which can be provided to each service node, with respect to each pair of service nodes in accordance with the historical record, the maximal service delay, and the control level between the service quality and the number of users; monitoring the service quality between a corresponding pair of service nodes in accordance with the content of service quality guarantee; and regulating the network service between a pair of service nodes in a case where degradation of service quality occurs between the pair of service nodes.

Further, the present invention is not limited to these embodiments, but variations and modifications may be made without departing from the scope of the present invention.

The present application is based on Chinese Priority Application No. 200610146537.4 filed on Nov. 15, 2006, with the Chinese Patent Office, and Japanese Priority Application No. 2007-255680 filed on Sep. 28, 2007, with the Japanese Patent Office, the entire contents of which are hereby incorporated by reference.

What is claimed is:

1. A method for guaranteeing a service quality of a network service, the method comprising:
   storing a historical record of a network service quality;
   inputting an acceptable maximal service delay of the network service;
   inputting a desired control level between the service quality of the network service and the number of users of the network service;
   determining a service quality guarantee, which can be provided to a corresponding pair of service nodes in accordance with the historical record, the maximal service delay, and the control level between the service quality and the number of users;
   monitoring the service quality between the corresponding pair of service nodes in accordance with the service quality guarantee; and
   regulating the network service between the corresponding pair of service nodes in a case where degradation of service quality occurs between the corresponding pair of service nodes.

2. The method as claimed in claim 1, wherein when a change occurs in the historical record of the network service quality between the corresponding pair of service nodes, the service quality guarantee is correspondingly adjusted in accordance with the acceptable maximal service delay of the network service, the desired control level between the service quality of the network service and the number of users, and the varied historical record of the network service quality.

3. The method as claimed in claim 1, wherein the monitoring of the service quality between the corresponding pair of service nodes further includes setting a safe range of service quality and determining whether the service quality of the corresponding pair of service nodes deviates from or returns to the safe range based on hypothesis testing, wherein the service quality of the corresponding pair of service nodes is determined to have degraded in a case where the service quality of the corresponding pair of service nodes deviates from the safe range.

4. The method as claimed in claim 3, wherein when service quality degradation is detected, changes of service quality are represented by changes of values of the degree of degradation and reported, wherein the control policy for the network service of the corresponding pair of service nodes is adjusted according to the report.

5. The method as claimed in claim 4, wherein the adjusting of the control policy for the network service of the corresponding pair of service nodes includes preventing degradation exceeding the acceptable maximal service delay of the network service by using a stricter control policy when the degree of degradation exhibits an increasing tendency and reducing the influence on an end user by using a looser control policy when the degree of degradation exhibits a decreasing tendency.

6. A system for guaranteeing a service quality of a network service comprising:
   a management apparatus;
   a monitoring apparatus; and
   a control apparatus;
   wherein the management apparatus is connected to the monitoring apparatus and the control apparatus via a network,
   wherein the management apparatus is configured to
      store a historical record of a network service quality,
      input an acceptable maximal service delay of the network service delay and a control level between the service quality of the network service and the number of users of the network service,
      obtain a service quality guarantee which can be provided to the network service between a corresponding pair of service nodes in the network in accordance with the historical record, the maximal service delay, and the control level between the service quality and the number of users, and
      exchange information between the monitoring apparatus and the control apparatus,
   wherein the monitoring apparatus is configured to monitor the network service quality between the corresponding pair of service nodes in real time in accordance with the service quality guarantee and reporting occurrence of degradation of the service quality between the corresponding pair of service nodes when the degradation occurs,
   wherein the control apparatus is configured to regulate the network service between the corresponding pair of service nodes upon receiving a command from the management apparatus.

7. The system as claimed in claim 6, wherein management apparatus is configured to input the acceptable maximal service delay of the network service, input a desired control level between the service quality of the network service and the number of users, and display the service quality guarantee of the corresponding pair of service nodes in the network and independently modifying the service quality guarantee of the corresponding pair of service nodes.

8. The system as claimed in claim 6, wherein the monitoring apparatus includes a plurality of monitoring apparatuses, wherein each monitoring apparatus is connected to a corresponding service node,
   wherein the monitoring apparatus is configured to
      transmit an emulated service flow, which emulates the network service, to another monitoring apparatus,
      receive the transmitted emulated service flow, calculate the service delay of the emulated service flow,
      detect degradation of the service quality, transmit an alarm message, an update message, and an alarm clearing message based on the calculated service delay together with information of a transmitter/receiver, and
      maintain/update the historical record of the service quality.

9. The system as claimed in claim 8, wherein the monitoring apparatus is configured to set a safe range of service quality and determine whether the service quality of the corresponding pair of service nodes deviates from or returns to the safe range based on hypothesis testing, wherein the service quality of the corresponding pair of service nodes is determined to have degraded in a case where the service quality of the corresponding pair of service nodes deviates from the safe range.

10. A non-transitory recording medium on which a program is recorded for causing a computer to perform a method for guaranteeing a service quality of a network service, the method comprising:
   storing a historical record of a network service quality;
   inputting an acceptable maximal service delay of the network service;
   inputting a desired control level between the service quality of the network service and the number of users of the network service;
   determining a service quality guarantee, which can be provided to a corresponding pair of service nodes in accordance with the historical record, the maximal service delay, and the control level between the service quality and the number of users;
   monitoring the service quality between the corresponding pair of service nodes in accordance with the service quality guarantee; and
   regulating the network service between the corresponding pair of service nodes in a case where degradation of service quality occurs between the corresponding pair of service nodes.

* * * * *